US006449657B2

(12) United States Patent
Stanbach, Jr. et al.

(10) Patent No.: US 6,449,657 B2
(45) Date of Patent: *Sep. 10, 2002

(54) INTERNET HOSTING SYSTEM

(75) Inventors: Francis J. Stanbach, Jr., Menlo Park; Daniel G. Hoffman; Bruce R. Keiser, both of Los Gatos, all of CA (US)

(73) Assignee: Namezero.com, Inc., Los Gatos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,770

(22) Filed: Aug. 6, 1999

(51) Int. Cl.[7] .............................................. G06F 15/16
(52) U.S. Cl. ........................ 709/245; 709/203; 705/14
(58) Field of Search ................................ 709/245, 201, 709/207, 203; 705/14; 707/203

(56) References Cited

U.S. PATENT DOCUMENTS

| 5,377,354 A | * | 12/1994 | Scannell et al. ............. 709/207 |
| 5,408,619 A | | 4/1995 | Oran .......................... 395/325 |
| 5,434,914 A | | 7/1995 | Fraser ........................ 379/219 |
| 5,664,185 A | * | 9/1997 | Landfield et al. ......... 707/104.1 |
| 5,729,689 A | * | 3/1998 | Allard et al. ............... 709/228 |
| 5,752,246 A | | 5/1998 | Rogers et al. ................ 707/10 |
| 5,764,915 A | | 6/1998 | Heimsoth et al. ....... 395/200.57 |
| 5,805,820 A | * | 9/1998 | Bellovin et al. ............. 709/225 |
| 5,809,242 A | | 9/1998 | Shaw et al. ............. 395/200.47 |
| 5,838,790 A | | 11/1998 | McAuliffe et al. ............. 380/4 |
| 5,848,397 A | | 12/1998 | Marsh et al. .................. 705/14 |
| 5,884,038 A | | 3/1999 | Kapoor .................. 395/200.56 |
| 5,937,162 A | | 8/1999 | Funk et al. ............. 395/200.36 |
| 5,937,392 A | | 8/1999 | Alberts ........................ 705/14 |
| 5,938,733 A | * | 8/1999 | Heimsoth et al. ............ 709/230 |
| 5,948,061 A | * | 9/1999 | Merriman et al. .......... 709/219 |
| 6,016,512 A | * | 1/2000 | Huitema ...................... 709/245 |
| 6,119,234 A | * | 9/2000 | Aziz et al. ................... 709/229 |

(List continued on next page.)

FOREIGN PATENT DOCUMENTS

| EP | 817444 A2 | * | 1/1998 | ........... H04L/29/06 |
| JP | 10320314 A | | 12/1998 | |
| JP | 2000242582 A | | 9/2000 | |

(List continued on next page.)

OTHER PUBLICATIONS

Mosher, The Microsoft Exchange User's Handbook, 1997, Duke Press, 1st ed., pp. 412–419.*
F. Manon, Free E–Mail Is Here But With Ads Aplenty, New York Post, Business, Jul. 27, 1995.
Freemark, Juno Online Plan to Offer Free Electronic Mail Accounts for Those Prepared to Receive Ads With Mail, Information Access Company, Aug. 24, 1995.

(List continued on next page.)

Primary Examiner—Glenton B. Burgess
Assistant Examiner—Bradley Edelman
(74) Attorney, Agent, or Firm—Irell & Manella LLP

(57) ABSTRACT

A method and apparatus for providing domain name services includes a multi-threaded name server which concurrently handles multiple domain name resolution requests and is particulary well suited for an Internet host system controlling information relating to a very large number of domain names. A database coherency thread continuously refreshes a host name cache that is utilized by the multi-threaded name server. The multi-threaded name server may comprise a request dispatcher thread capable of spawning multiple child threads, resulting in a multi-threaded, non-blocking name server. One or more additional network services are also provided by the system, preferably through a common, centralized database. For example, in one embodiment, electronic message forwarding services are provided. In another embodiment, web services are provided wherein hypertext markup language (HTML) pages are dynamically generated from data in the database corresponding to the requested host name.

8 Claims, 9 Drawing Sheets

U.S. PATENT DOCUMENTS

| | | | |
|---|---|---|---|
| 6,199,102 B1 | 3/2001 | Cobb | 709/206 |
| 6,205,432 B1 | 3/2001 | Gabbard et al. | 705/14 |
| 6,289,373 B1 | 9/2001 | Dezonno | 709/206 |
| 6,308,202 B1 | 10/2001 | Cohn et al. | 709/217 |

FOREIGN PATENT DOCUMENTS

| | | | | |
|---|---|---|---|---|
| JP | 2000270013 A | | 9/2000 | |
| WO | WO 96/24213 | * | 8/1996 | H04L/29/06 |
| WO | WO 98/12643 | | 3/1998 | G06F/13/00 |
| WO | WO 98/26558 | | 6/1998 | H04L/29/12 |
| WO | WO 99/09726 | | 2/1999 | |
| WO | WO 99/17505 | | 4/1999 | H04L/12/58 |
| WO | WO 99/18515 | | 4/1999 | G06F/15/177 |
| WO | WO 99/23571 | | 5/1999 | G06F/15/17 |
| WO | WO 99/27680 | | 6/1999 | H04L/12/00 |

OTHER PUBLICATIONS

S. Mohan, 'Free Mail' On the 'Net Forces Users to Trade Off Privacy, Computerworld, vol. 29, No. 48, Nov. 27, 1995.

D. Williamson, This E–Mail Messge is Brought to You By . . . , Advertising Age, Apr. 17, 1995.

Free E–Mail With Postage Stamp "Ads", Post–Newsweek Business Information, Inc., Jul. 3, 1995.

P.V. Mockapetris, et al., Development of the Domain Name System, Communications Architectures & Protocols, Aug. 16–19, 1988, pp. 123–133.

P.B. Danzig, et al., An Analysis of Wide–Area Name Server Traffic, ACM, Aug., 1992, pp. 281–292.

P. Mockapetris, Domain Names—Implementation and Specification, Internet RFC 1035, Nov. 1987.

P. Mockapetris, Domain Names—Concepts and Facilities, Internet RFC 1034, Nov. 1987.

A Brief History of BIND, Internet Software Consortium, <http://www.isc.org/view.cgi?/products/BIND–history-.phtml>, 1999.

ISC BIND Plans, Internet Software Consortium, <http://www.isc.org/view.cgi?/products/BIND/plans.phtml>, 1999.

BIND for NT (freeware), Software.com, <http://www.software.com/products/bindnt.html>, 1999.

BIND Version 8.2xHighlights, Internet Software Consortium, <http://www.isc.org/view.cgi?/products/BIND/docs/bind8.2_highlights.phtml>, 1999.

* cited by examiner

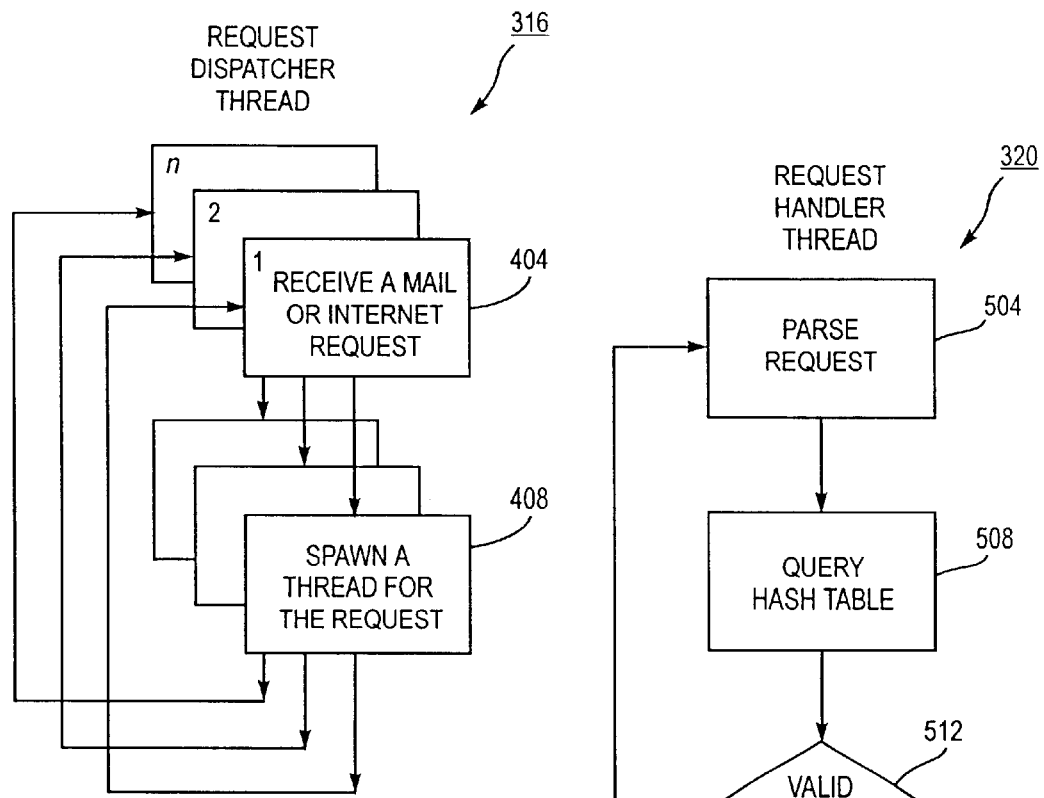
Fig. 4
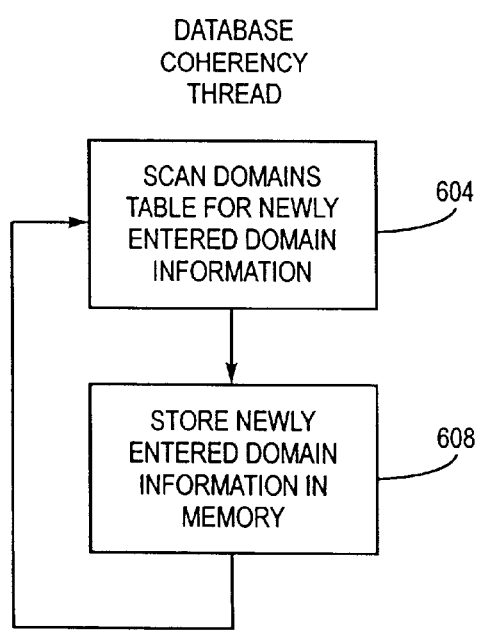
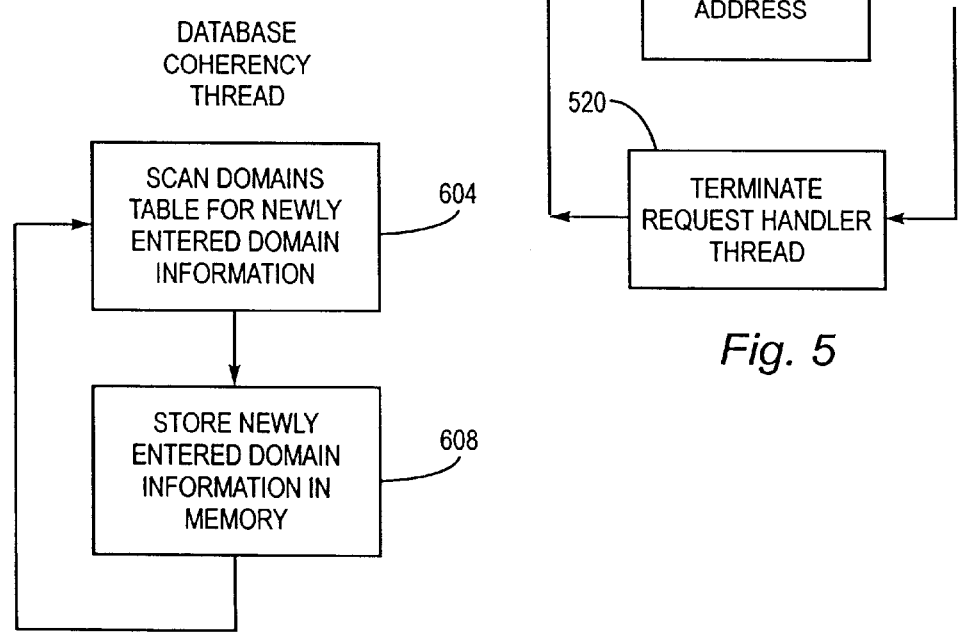
Fig. 6
Fig. 5

INTERNET HOSTING SYSTEM

CROSS REFERENCE TO RELATED APPLICATIONS

This application is related to U.S. patent application Ser. No. 09/369,647, entitled "MULTI-THREADED NAME SERVER" and 09/370,094, entitled "E-MAIL ADVERTISEMENT SELECTION METHOD AND APPARATUS", both filed on the same day herewith, and both of which are incorporated herein by reference in their entirety.

FIELD OF THE INVENTION

The field of the present invention generally relates to networking, and more particularly, to methods and techniques for hosting internet services on a network.

BACKGROUND

The Internet has become a very popular global electronic communication network that has brought about a wide variety of on-line services and development of the World Wide Web (WWW). The number of computers and users accessing the Internet continues to increase rapidly.

Computers on the Internet generally exchange information in the form of packets or datagrams with each other using unique addresses, known as host addresses. The most common form of a host address is an Internet Protocol (IP) address, which is presently a four part sequence of numbers that uniquely identify a particular computer on the Internet. An example of a host address is the IP address "206.71.200.33".

Users commonly access the Internet through one or more clients and servers. Each client and server generally consists of hardware equipment executing one or more software processes that maintain connections to various networked computers. Perhaps the most common tool employed by users for connecting to the Internet is a client or user program called a "browser". Netscape Corporation's Navigator and Microsoft Corporation's Internet Explorer are two forms of browsers, also known as "web clients". Other forms of interaction on the Internet include electronic mail (e-mail), wherein one user sends electronic messages addressed to another user, usually through a mail client such as Qualcomm's Eudora Lite mail client.

Users generally do not use host addresses to connect their clients to remote computers or servers on the Internet. Rather, users employ host names, or "domain names" to access a particular computer or server on the Internet. In current Internet parlance, domain names are generally comprised of alphanumeric characters that correspond to a host address on the Internet. An example of a domain name is "yahoo.com".

Domain names generally comprise multiple parts. A root name or top level domain is the ending suffix on a domain name. Examples of top level domains, or root names, include "edu", "com", and "org". Second level domains immediately follow a top level domain (generally a period, also known as "dot", separates levels of a domain). Examples of second level domains include "mit", "yahoo" and "icann". Multiple additional domain levels can be added to a domain to yield a complete domain name, such as "www.yahoo.com."

As used in a web client, the domain name might be "http://www.yahoo.com" (the "http://" portion specifying the hypertext transfer protocol (HTTP) proxy), whereas in a mail client, the domain might be in the format of an e-mail address, such as "mailto:alice@smith.com" (the "mailto:" portion specifying the simple mail transfer protocol (SMTP) proxy).

To provide a transparent mapping between host names and host addresses to users, a domain name system is employed. The domain name system, or DNS, in current use on the Internet is generally described in a technical specification known as Internet RFC 1034, entitled "Domain Names—Concepts and Facilities," and additional features thereof are described in a related technical specification known as Internet RFC 1035, entitled "Domain Names—Implementation and Specification," both of which are authored by P. Mockepetris.

The domain name system described in RFC 1034 has three major components: (1) domain name space and records, which collectively comprise a tree-type data structure used for the mapping; (2) name servers, which are server programs that hold information about the tree structure and point to other name servers that hold information about the tree structure; and (3) resolvers, which are client programs that extract information from name servers in response to client requests.

One configuration for a domain name system (DNS), and the DNS envisioned by RFCs 1034 and 1035, is depicted as a flow diagram in FIG. 1. A shared database holds domain space data for a local name server and a resolver that are associated with a local host.

The contents of the shared database will typically be a mixture of authoritative data maintained by periodic refresh operations from master files by the name server, and non-authoritative cached data from previous resolution requests or maintenance queries that were answered by one or more foreign name servers. The contents of the shared database are generally in the form a flat file comprising a plurality of resource records (RRs). Resource records correlate a particular host name or domain name with its host address and other protocol information on the Internet. As such, resource records generally comprise a number of fields. It should be noted that the name server is responsible for maintaining current resource records for the domain names for which it is the authority and any other non-authoritative domain names specified by the domain name system.

The shared database is generally not a typical database. The shared database is called such because it represents a plurality of resource records distributed among various computer systems (or other domain name systems) throughout the Internet. Although the shared database might have somewhat current resource records for which it is the authority (or in its "zone"), the resource records for which it is not the authority must be periodically updated or "refreshed" from multiple foreign resolvers or from foreign name servers. Theses refresh operations are performed to account for changes in the mappings between host names and host addresses. This process occurs for authoritative resource records too. The shared database is thus a distributed resource record database and is inextricably tied to other authoritative domain name systems on the Internet in order to operate in view of RFC 1034 and 1035. As such, a highly coherent or synchronized view of the database is unlikely, given the highly distributed nature of the Internet and the number of domains therein.

When a user program, such as the browser, requests information from, or attempts to send information to a particular host name, a resolution request is passed in the form of a query to the resolver. The query uses as arguments a proxy, a host name, and other data. The resolver will check the shared database for a corresponding host address to the host name in the shared database or from the name server. If a corresponding resource record exists in the shared database, it will be returned to the resolver and then to the user program. However, if a resource record does not exist, then the resolution request is passed on to a local name server (for authoritative data) or to a foreign name server (for non-authoritative data).

The set of domains for which a particular name server is the authority is commonly referred to as a zone. Data outside the zone is the responsibility of another name server. When a resolution request is made for non-authoritative data—data that is also not present in the shared database—the response is handled as a "zone transfer". To resolve the resolution request, the request is passed on to a foreign name server, preferably the name server that is the authority for the domain name. Various techniques can be employed to resolve such requests for non-authoritative data.

In particular, it is noted that because a foreign name server will resolve such requests, the latency between the query and the response can be great. The prior domain name system, as described in RFC 1034, envisions that zone transfers should be non-blocking, meaning that zone transfers should be handled immediately—that a second zone transfer should not wait for a first zone transfer to be completed before handling the second zone transfer. Thus, valuable execution processing cycles will not be wasted while the foreign name server performs the work.

However, when authoritative requests are made or requests for non-authoritative data that is contained in the shared database, known domain name systems block concurrent or subsequent requests until earlier requests have been handled. This is likely so because the name server can be responding to either local or foreign resolvers and because the authoritative name server must perform the work dictated by the request, such as checking resource records and formulating a response. The responses, of course, can vary depending on the type of the request, such as a mail exchange, hypertext transfer protocol, etc. Handling the resolution request can also involve querying foreign resolvers and/or foreign name servers. The varied nature of the work performed by the name server suggests that it is either not efficient, or not prudent to share execution memory or resources when responding to resolution requests where the name server must perform the work. Moreover, the existing domain name system was designed to be portable, meaning it is capable of running on a variety of operating systems. However, there is no good portable multi-threaded application programming interface available on the market today. Furthermore, the overhead involved with multi-threading simply is not effectively amortized over the small number of domain names most domain name systems support.

One option to overcome the drawbacks of overworking a domain name system is to employ multiple name servers and attempt to balance the workload on each name server. A separate computer system, a load balancer, is disposed between remote systems and multiple name servers. The load balancer intercepts incoming resolution requests and assigns those requests in a round-robin fashion to one of the multiple name servers. Such a technique, however, can further drain existing system resources, and it can require additional hardware (e.g., a separate computer system for each name server) to implement. Additionally, redundant information must be stored in each of the multiple name servers such that each name server is capable of handling the same sets of authoritative and non-authoritative resolution requests.

Perhaps the most common domain name system software used today is the Berkeley Internet Name Domain, commonly referred to as "BIND". BIND (the most current version of BIND is Ver. 8.2) is an open source, general purpose implementation of a domain name system protocol.

Whereas BIND may be adequate for most large-scale hosts supporting a limited number of domains, BIND may not be suitable, or may prove to be inadequate, for systems in which the host is designed to be a name server for many domains—particularly in the order of the thousands or more of domain names.

For example, one drawback to BIND is that when resource records are updated, the host software often needs to be restarted, causing undesirable delays or down time. Another drawback or limitation is that BIND is a blocking server, meaning that only one "thread" exists for answering queries to resolve a domain name in the server's zone. (As used herein, a "thread" refers to a part of a computer software code that can execute independently relative to other parts of the code.) The BIND system described above, "single threaded", meaning that its code may activate more than one processor, but it does so in a way that at any given time only a single processor is active—only one thread is allowed to answer queries in the server's zone at a particular time. If a name server using BIND serves hundreds, or thousands, of domain names, the latency between a resolve request and the response can be significant.

These limitations or drawbacks to BIND are compounded by the fact that growth of the Internet is continuing to expand at a very rapid rate, which results in the constant addition of a large number of new domain names on a daily basis. This rapid growth of domain names is stressing the infrastructure of the Internet. Resource records need to be frequently updated, and IP addresses sometimes change. Since BIND often requires the host software to be restarted when resource records are updated, a system based on BIND is not well suited to maintaining an ever-expanding collection of domain names. Further, BIND, in its present implementations, lacks a suitable mechanism for handling the potentially large number of queries to resolve domain names where the system has hundreds or thousands of domain names and is continuously expanding.

Given the growth of the Internet and the fact that many casual users of the Internet would like to maintain domain names, but are often unable to do so due to costs associated therewith, the inventors have recognized that it would be advantageous to provide an improved name server and domain name hosting system that is scalable and that is able to answer simultaneous requests for thousands of different domain names, and to implement such a system on a single computer system or network.

SUMMARY OF THE INVENTION

A method and apparatus for providing domain name services is provided. According to one aspect of the invention, a multi-threaded name server handles multiple concurrent name requests, and is particularly well suited for a host system controlling information relating to a large number of domain names. In a preferred embodiment as described herein, a multi-threaded name server comprises a request dispatcher thread capable of spawning multiple child threads. For each name request received by the request dispatcher thread, the request dispatcher spawns a child thread to handle the request. The child threads query a host name cache to determine whether the host name cache comprises a host name matching a host name in the name request. The result is a multi-threaded, non-blocking name server capable of handling multiple concurrent name requests for a large number of domain names.

In one embodiment, one or more additional network services are also provided, preferably using a centralized database. For example, in a particular embodiment, electronic message forwarding services are provided wherein an advertisement is associated with an electronic message based on the message contents. In another embodiment, web services are provided wherein hypertext markup language (HTML) pages are dynamically generated. In still another embodiment, both electronic message forwarding services and web services are provided on by the same system using the centralized database.

Further embodiments, enhancements and variations of the foregoing are also described herein.

BRIEF DESCRIPTION OF THE DRAWINGS

The figures in the accompanying drawings depict details of the invention by way of example and not by way of limitation, in which like reference numerals refer to like parts, in which:

FIG. 4 is a flowchart depicting acts performed by a request dispatcher thread.

FIG. 5 is a flowchart depicting acts performed by a request handler thread.

FIG. 6 is a flowchart depicting acts performed by a database coherency thread.

DETAILED DESCRIPTION OF THE PREFERRED EMBODIMENTS

Multi-threaded Name Server

Figure 1:
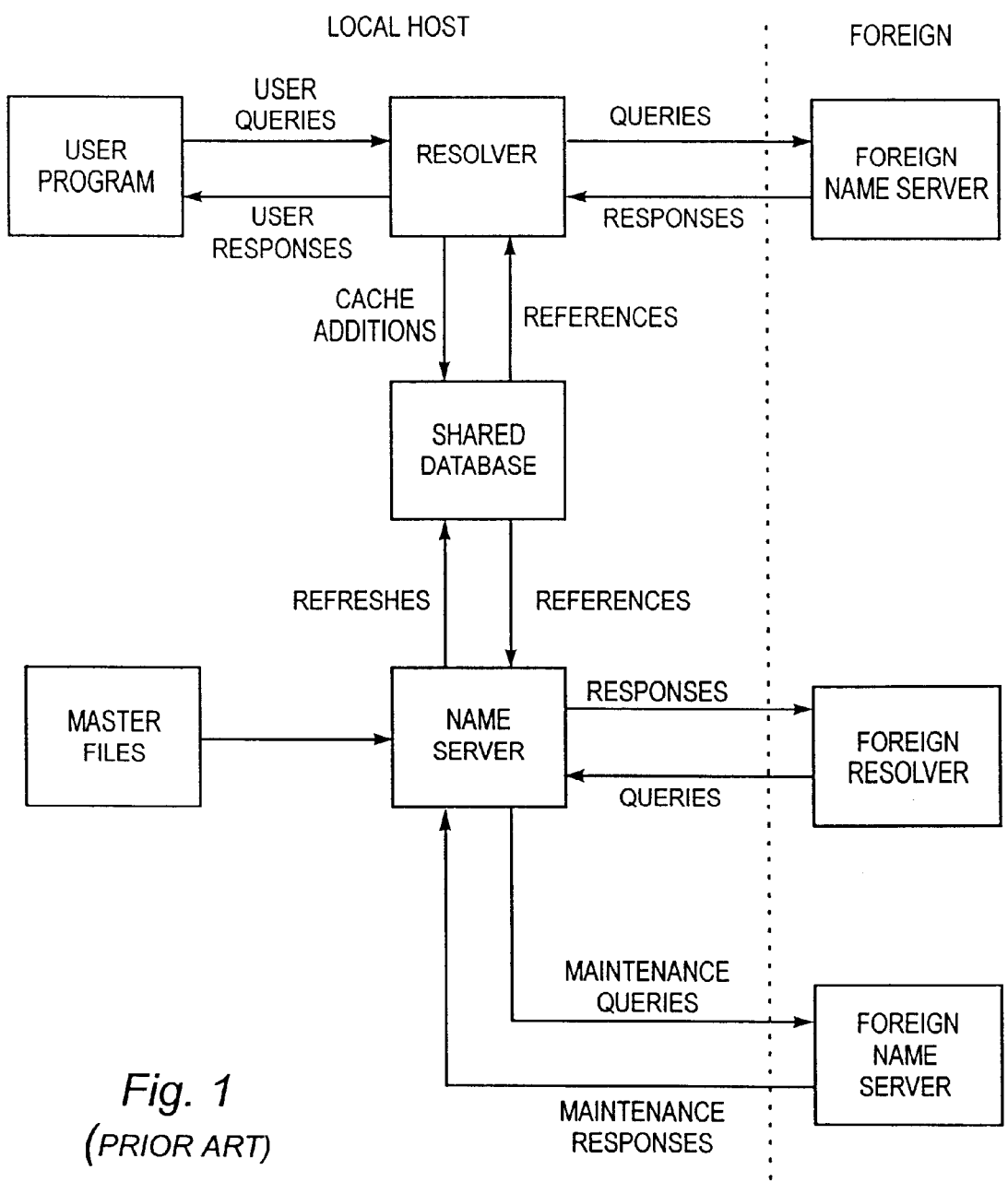
FIG. 1 is a block diagram illustrating a configuration for a domain name system as known in the prior art.
Figure 2:
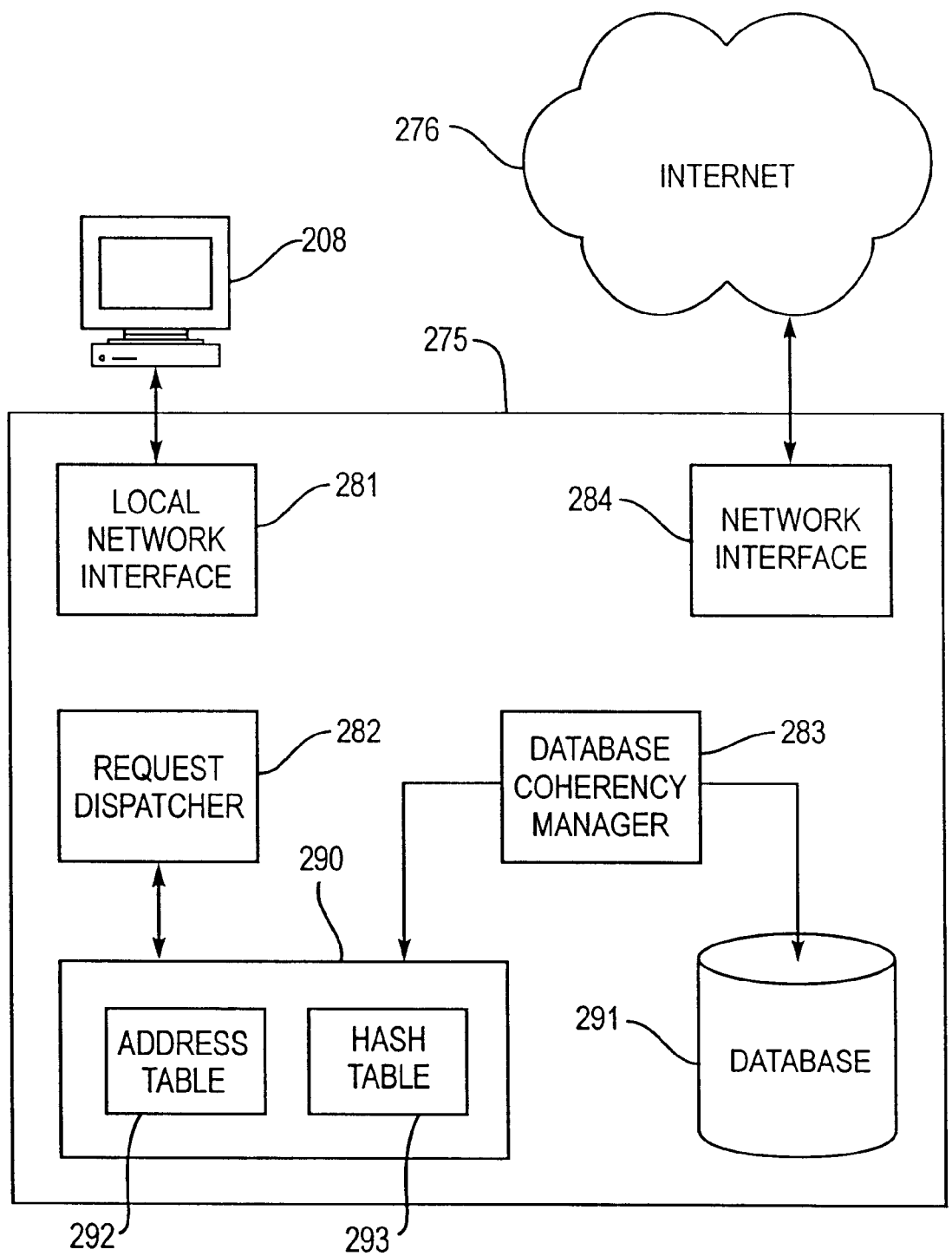
FIG. 2 is a diagram of a multi-threaded name server in accordance with a preferred embodiment as described herein.

FIG. 2 is a conceptual diagram of a multi-threaded name server 275 according to a presently preferred embodiment as described herein. As shown in FIG. 2, the multi-threaded name server 275 comprises a database 291 which may store, among other things, IP addresses and related information. The multi-threaded name server 275 further comprises a random-access memory 290 comprising an address table 292 and a cache 293. A database coherency manager 283 interacts between the information stored in the database 291 and the cache 293. A request dispatcher 282 accesses information from the memory 290, and particularly the cache 293 and/or address table 292, to respond to queries or foreign requests as further described herein.

It will be appreciated by those skilled in the art that many possible physical arrangements of memory for the database 291 and random access memory 290 exist, and the present invention is not to be limited by the conceptual depiction in FIG. 2. For example, the database 291 may, in certain embodiments, be physically located at a site remote from the physical location of the multi-threaded name server 275, so long as it is accessible to the database coherency manager 283. Further, the address table 292 and cache 293 are conveniently depicted as sharing the same random access memory 290, but it is not necessary that they are physically stored in the same memory hardware. Those skilled in the art will understand that there are many equivalent ways of arranging and implementing the features depicted in FIG. 2.

A network interface 284 connects the multi-threaded domain server 275 to an electronic communication network, such as the Internet 276. A local network interface 281 connects the multi-threaded domain server 275 to a local network or system controller 280, whereby the multi-threaded domain server 275 may be maintained or reprogrammed.

In operation, resolution requests are received by the multi-threaded name server 275 over the Internet 276 from resolver software on a remote domain name system. The request dispatcher 282 spawns a new child thread to process each new resolution request received by the multi-threaded name server 275. The child threads (referred to herein as "request handler threads") handle resolution requests and returns information (e.g., the desired host name) to the request dispatcher 282, which may pass the information back to the source from which the resolution requests were initiated.

Figure 3:
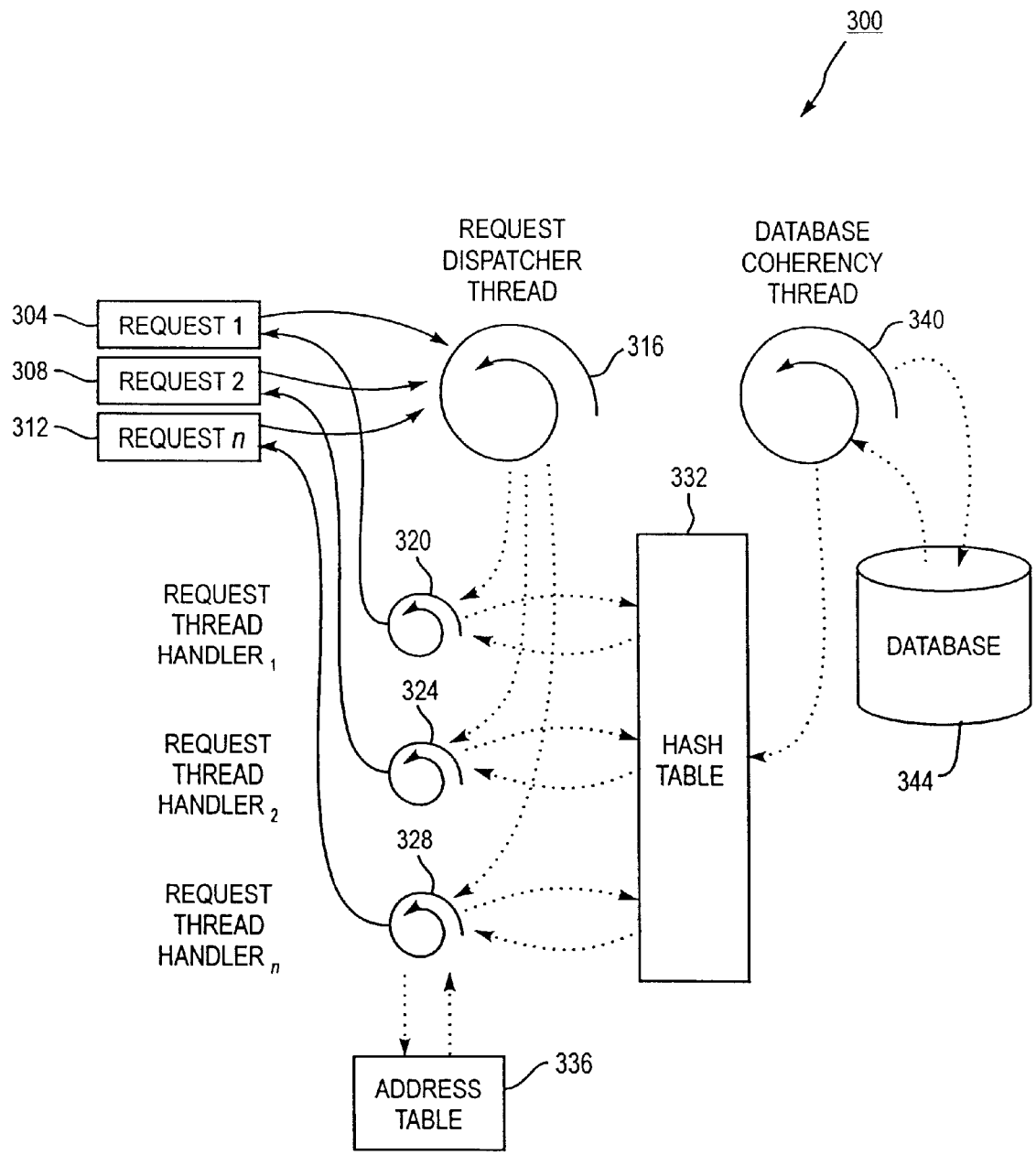
FIG. 3 is a diagram illustrating operation of a multi-threaded name server.

FIG. 3 is a block diagram depicting in more detail operation of a multi-threaded name server 300 according to a presently preferred embodiment as described herein. Shown in FIG. 3 are a database 344, address table 336 and hash table 332, which are generally analogous to the elements having the same descriptors shown in FIG. 2, the hash table 332 being an implementation of the cache 293.

As shown in FIG. 3, incoming resolution requests 304, 308 and 312 are received by the multi-threaded name server 300. The resolution requests 304, 308, and 312, as noted, typically originate from resolver software on remote client systems. A continuously running request dispatcher thread 316 spawns a new child thread (i.e., a request handler thread) to process each new resolution request 304, 308 and 312. Thus, request handler threads 320, 324 and 328 are spawned by the request dispatcher thread 316 in response to resolution requests 304, 308 and 312, respectively. The request dispatcher thread 316 may be managed, for example, by an appropriate software management routine such as request dispatcher 282 shown in FIG. 2. Information retrieved from the inbound resolution request, such as the host name, is passed to the particular request handler thread 320, 324 or 328 spawned by the request dispatcher thread 316.

The child threads (e.g., request handler threads 320, 324 and 328) spawned by the request dispatcher thread 116 are executed concurrently, that is, they are "multi-threaded". (As used herein, "multi-threaded" refers to a technique for thread execution whereby the program execution code is shared by more than one concurrently running, or "active" thread. Whereas the program variables and pointers can vary between two or more threads, they are executing the same block of program code. Generally speaking, more than one process or processor can be active at any given time. This is in contrast to single threaded programming where only a single process or processor is allowed to be active at a particular time.) According to one embodiment, the processes are executed concurrently by a single processor. However, in other embodiments, multiple processors perform the threads concurrently. In a preferred embodiment, the multiple processors can not only execute concurrently, but also simultaneously. Thus, the name server is non-blocking.

FIG. 4 is a flowchart depicting steps performed by the request dispatcher thread 316 in accordance with a preferred process flow. Represented by the flowchart in FIG. 4 is processing of multiple request handler threads corresponding to resolution requests 304, 308 and 312 (see FIG. 3). In step 404, the request dispatcher thread 316 receives one or more resolution requests (e.g., resolution requests 304, 308 and/or 312). In response, in step 408, a new child thread (e.g., request handler thread 320, 324 and/or 328, respectively) is spawned to handle the request. Preferably the resolution request 304, 308 or 312, or at least the host name and type associated with the resolution request 304, 308 or 312, is passed to the child (i.e., request handler) thread 320, 324 or 328 as part of process of spawning a new request handler thread 320, 324, 328 (step 408).

According to a presently preferred embodiment, the multi-threaded name server 275 only responds to resolution requests for domains to which it is the authority. The multi-threaded name server 275 preferably does not resolve other host names for which it is not the authority. Also, there is no local resolver for handling outward bound host name resolution requests (although one could be used). This operation differs from traditional name servers employed by Internet access or Internet service providers, which usually employ general purpose name servers that handle both outbound host name resolution requests as well as inbound resolution requests, regardless of whether the name server is the authority.

FIG. 5 is a flowchart depicting steps performed by the child threads (such as request handler threads 320, 324 and 328 shown in FIG. 3), in accordance with one embodiment as described herein. As shown in FIG. 5, in step 504, the individual request handler threads 320, 324, 328 first parse the resolution request 304, 308 and 312, respectively. The host name associated with the resolution request 304, 308 and 312 is identified as part of step 504. In a next step 508, the host name hash table 332 is queried by the request handler thread 320, 324 or 328. Specifically, the request handler thread 320, 324 or 328 searches the host name hash table 332 for a matching host name. According to one embodiment, only second level and top level domains are queried at this stage—in other words, domain names of the format "yahoo.com" as opposed to names such as "www-.yahoo.com". However, third level (and beyond) domains can also be queried as part of step 308.

In a preferred embodiment, zone transfers are not performed by domain name server 275, as the domain name server 275 only responds to resolution requests for which it is the authority.

According to one embodiment, a host name hash table 332 (see FIG. 3) comprises a plurality of host names (e.g., "yahoo.com", "mit.edu" and "icann.org"). Host addresses, such as Internet protocol (IP) addresses need not be stored in the host name hash table 332, nor does other protocol information. Instead, the IP addresses and other protocol information are stored in a separate location, such as address table 336. Such a configuration reduces redundancy in the hash table 332, as a small number of IP addresses and common protocols can correspond to many more host names.

Returning to the description of FIG. 5, based on the query in step 508, a test is performed in step 512 to determine whether the host name exists in the host name hash table 332. If it does, then a responsive message, including the host address, is sent from the request handler thread 320, 324 or 328 to the requester (e.g., the IP address provided by the requester in the resolution request 304, 308 or 312). According to one embodiment, the request handler thread 320, 324 or 328 retrieves a host address corresponding to the resolution request type (e.g., webserver, mail exchanger, etc.) and returns the host address in the response. However, if the host name hash table 332 does not contain the host name, then in step 520 the request handler thread 320, 324 or 328 terminates and no response is returned to the requester.

Returning to FIG. 3, the database coherency thread 340 of the multi-threaded name server 300 is preferably running continuously. According to one embodiment, the multi-threaded name server 300 itself executes the database coherency thread 340; however, according to alternative embodiments, the database coherency thread 340 can be a remote procedure call, and/or a "daemon" executing on a processor separate from a processor physically associated with the multi-threaded name server 300.

The database coherency thread 340 monitors the centralized database 344 for updates to host names for which the multi-threaded name server 300 is the authority. Additions, deletions and modifications to the host names in a domain name table in the database 344 are propagated by the database coherency thread 340 as soon as possible to the host name hash table 332. In this way, the database coherency thread 340 synchronizes the view of the host names from the host name hash table 332 with the data stored in database 344. Moreover, the name server 300 does not have to be restarted when the domains are updated in the host name hash table 332. Thus, variations between the data stored in the host name hash table 332 and the database 344 are minimal and transient.

FIG. 6 is a flowchart illustrating the general steps performed by the database coherency thread 340 in accordance with a preferred embodiment as described herein. As shown in FIG. 6, the database coherency thread 340 operates in a continuous loop. In a first step 604, the database coherency thread 340 causes the domain name table in the database 344 to be scanned for new domain name information. The domain name information can include such things as additions of new data and deletions or modifications of existing data. In step 608, the newly updated domain name information is stored in the host name hash table 332. That is, information added to the domain name table of database 344 is added to the host name hash table 332; information modified in the domain name table of database 344 is modified in the host name hash table 332; and information deleted from the domain name table of database 344 is deleted from the host name hash table 332. According to one embodiment, only the domain name is stored in the host name hash table 332, as the information used for the response can be drawn from the address table 336. However, in other embodiments, the host name hash table can comprise additional information, such as information detailing requests for the particular domain name—e.g., a counter, and/or a reference URL (the URL from which the request was made—e.g., "yahoo.com").

Because the multi-threaded name server 300 responds only to requests for which it is the authority, resource records stored in the database 344 can be minimal in size. Moreover, because the name server 300 is the authority for numerous domains, the database 344 can eliminate redundancies and unnecessary fields in the resource records that might not otherwise be standardized in systems not leveraging this economy of scale for speed, scalability and administration. Accordingly, the address table 336, or a similar, modified table can hold a single instance of the various profiles (e.g., host name addresses and other protocol information) of resource records supported by the name server 300. These advantages allow the multi-threaded name server 300 to be used in service environments previously not served or contemplated, due to limitations of traditional name server architectures.

E-mail Advertisement Selection

Once the multi-threaded name server 300 has responded to a resolution request, the original resolution request will be directed toward the host address included in the request handler's response. According to a presently preferred embodiment of the invention, the same computer system that acts as the authority for the numerous host names also acts a mail transfer agent.

In the preferred embodiment, the mail transfer agent receives (or retrieves, as the case may be) electronic messages (e.g., via simple mail transfer protocol, also known as "SMTP", or post office protocol, version 3, also known as "POP3", or internet message access protocol, also known as "IMAP", or Lotus Development's cc:Mail system, etc.), processes the electronic messages according to techniques described herein, and then forwards the messages to an intended recipient corresponding to the host name identified in the database 344. It is noted that electronic messages, or "e-mail messages" are not limited to any particular type of e-mail messages, as is noted in the various systems specified above; rather, e-mail message generally refers to any electronic message between two users connected, at the same time (e.g., instant messaging) or at separate times (e.g., traditional e-mail applications/clients), to a network.

To process the e-mail messages, the mail transfer agent scans the contents of an e-mail message and selects an advertisement to associate with the e-mail message based on the location of certain key words or phrases in the message body, and also, if desired, upon personal information stored about the intended recipient or other criteria.

While the e-mail advertisement presentation system is described below with reference to particular preferred embodiments, it should be understood that in other embodiments, the e-mail advertisement presentation system described below can be a stand-alone system, as such services are not necessarily dependent upon the manner in which a resolution request was answered.

An overview of the e-mail advertisement presentation process is as follows, keeping in mind that the order of the particular steps described may vary depending upon the preference of the system designer. After receiving an e-mail message from a mail agent or other means, the system extracts the intended recipient information from an e-mail message header. A demographic profile of the intended recipient is generated (or selected, as the information already exists). Next, a set of advertisements matching the demographic profile of the intended recipient is selected from a table of advertisements. The contents of an e-mail message body are used to form a query to apply to a set of advertisements matching the demographic profile of the intended recipient. Next, the query is applied to the set of selected advertisements, and an advertisement (or possibly a set of advertisements) is selected and associated with the e-mail message. Ultimately, the advertisement is presented to the intended recipient, by either inserting the advertisement into the e-mail message body, or attaching the advertisement to the e-mail message, or inserting the advertisement in or attaching the advertisement to a subsequent e-mail or other message transmitted to the intended recipient at a later time. Other embodiments of e-mail advertisement presentation in accordance with the principles described herein will also be apparent upon review of the present disclosure, including the accompanying text and figures.

Figure 7:
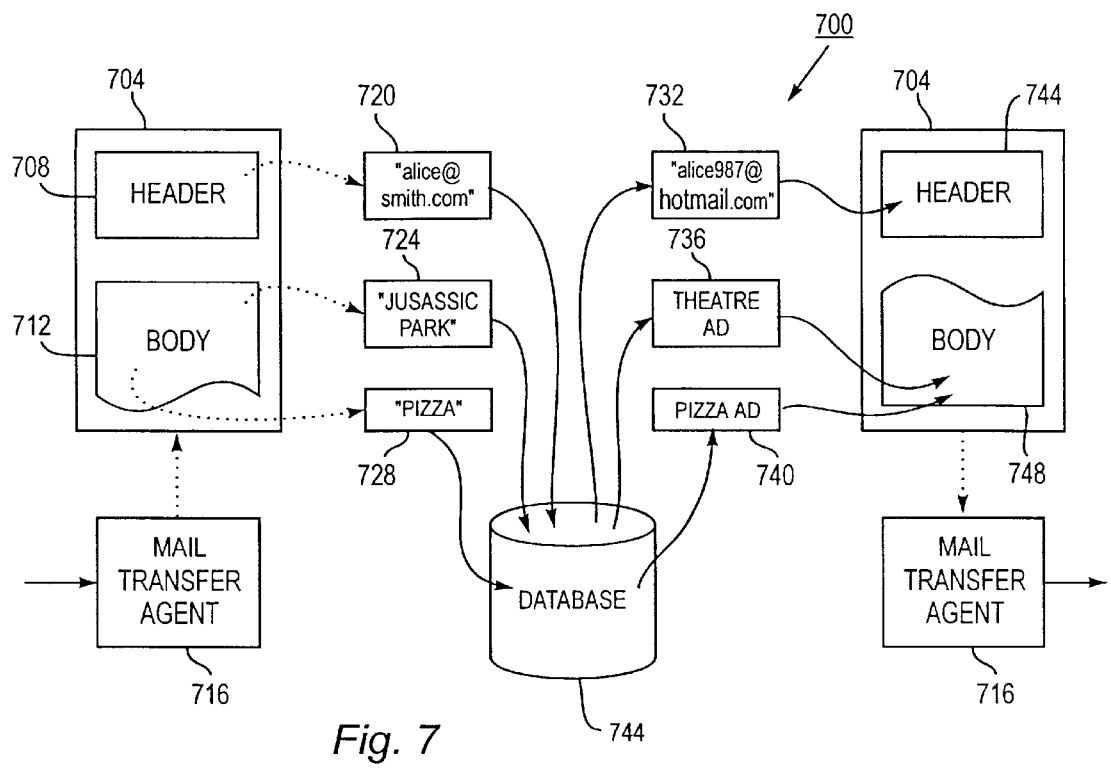
FIG. 7 is a diagram depicting an e-mail forwarding and advertisement insertion system in accordance with a preferred embodiment as described herein.

FIG. 7 is a schematic depicting a presently preferred e-mail forwarding system 700 for selecting and inserting an advertisement into an e-mail message 704. The e-mail message 704 generally comprises two parts, a header 708, which identifies routing information, such as the SMTP "Mail From" and "Rcpt To" data, and a body 712. The "Mail From" and "Rcpt To" sections of the e-mail header 708 are sometimes referred to as the SMTP "envelope", as they contain both forward and reverse path information, just as a "snail-mail" (i.e., regular postal) envelope would have affixed to it a destination address and return address. The body 712 of the e-mail message 704 contains other information, such as, for example, a subject header and the text of the e-mail message 704 itself.

According to a preferred embodiment as described herein, once the e-mail message 704 is received by the mail transfer agent 716, the mail transfer agent 716 examines the header 708 of the message. The e-mail processor extracts from the e-mail message 704—and particularly the e-mail header 708—information identifying the intended recipient(s) 720 of the e-mail message 704. For example, if the "Rcpt To" field indicates that the e-mail message 704 is directed to intended recipient "alice@smith.com", then the intended recipient username ("alice") and domain name ("smith.com") are extracted by the e-mail processor.

The intended recipient information 720 extracted from the e-mail message 704 is then used to query a database 744 (which may be, in some embodiments, the same as database 344 shown in FIG. 3, where the multi-threaded name server 300 is used in the same system as the e-mail processor). (An embodiment of an exemplary database schema for a database is described below with reference to FIG. 9, but other types of database schema may also be used depending upon the particular needs of the system, as will be apparent to those skilled in the art.) After extraction of the relevant information from the message header 708, the domain names served by the system 700 are queried for the extracted domain name to ensure that it is a "valid" (i.e., recognized) domain name. This confirmation process can be accomplished, for example, by re-querying the host name hash table 332 (in embodiments where the e-mail processor is used in conjunction with the multi-threaded name server 300), or by querying a mail table in the database 744. Once the domain name (e.g., "smith.com") is confirmed, then the username (e.g., "alice") is also confirmed by the e-mail processor, this time by querying the username in the mail table (although alternatively, a single query to the mail table could be used in some embodiments to confirm the validity of both the username and domain name).

If both the username and domain name are successfully confirmed, then the pair is matched to information identifying a forwarding e-mail address 732 (e.g., "alice987@hotmail.com") for the intended recipient.

According to a presently preferred embodiment, the forwarding e-mail address 732 is an address to a remote e-mail service that is not part of the e-mail forwarding system 700, although in alternative embodiments the forwarding e-mail address 732 could be to an e-mail service that is operated in conjunction with the e-mail forwarding system 700. The forwarding address 732 is used to relay or forward the e-mail message 704 by the mail transfer agent 716 to the remote (or other) e-mail system, after further processing by the e-mail forwarding system 700 as described below.

In one embodiment, a demographic profile corresponding to the recipient address 720 is established by querying the database 744. The query can be performed on a favorites table, or a client table, or some other table comprising demographic information on the intended recipient (e.g., favorites table 964 or client table 912 in FIG. 9). The demographic profile generated on the intended recipient 720 is then used to create a sub-set of advertisements from an ads table (e.g., ads table 960 in FIG. 9). This sub-set of advertisements from the ads table is particularly focused towards the demographic profile matching the intended recipient 720.

Next, the mail transfer agent 716 examines the body 712 of the e-mail message 704. Keywords or phrases are extracted from the body 712 and a query is generated. According to one embodiment, the query can logically OR each of the words together. The query, preferably a structured query language (SQL) query, can be recreated and applied to the ads or ads keyword tables multiple times in different formats. For example, a rank or score can be given to each query. Queries with the logical operator AND between the keywords having a greater significance than queries using the logical operator OR.

In another embodiment, the ad selection process does not have to perform multiple levels of queries, wherein each query narrows the set of advertisements likely to match the intended recipient's demographic profile. Rather, a single query based upon the contents of the e-mail message body 712 and the demographic profile of the intended recipient 720 can be created.

Various other combinations of the above techniques, or enhancements thereto, are also possible. For example, the e-mail body 712 can be subjected to two types of searches, the first search being for keywords or phrases stored in the ad keyword table table (e.g., ad keyword table 968 in FIG. 9). The keywords providing the basis of the query on the body 712 could have been first reduced by filtering out advertisements not matching the demographic profile of the intended recipient 720.

In another embodiment, all or a portion of the advertisements can be selected without regard to demographic and/or personal information-of the intended recipient 720. For example, some advertisements might have "super words" that do not have to match any particular demographic or personal information. For instance, if a popular movie has been released (e.g., "Jurassic Park"), the message body 712 can be examined for part or all of the phrase (the phrase being considered a "super word"). The selection of advertisements having super words can be performed in combination with the selection of advertisements matching demographic profiles, as is described above.

It is contemplated in various embodiments that a significant number of advertisements may be stored in the database 744. Moreover, it is also contemplated in various embodiments that a significantly greater number of e-mails (possibly thousands or tens of thousands) are received for processing during a relatively short period of time. It is therefor preferred that the database 744 be partitioned or indexed in a meaningful manner, or that subsets of record data (e.g., advertisements, advertisement demographics, and/or user demographics) are organized to reduce the burden of processing queries on the database 744. (Partitioning and indexing refer to data organization techniques, examples of which are generally known in the art of relational database management systems, and which are available in commercially available databases such as Oracle Corporation's ORACLE 8i™ database or Microsoft Corporation's SQL Server 7.0 database, for example.) Accordingly, the advertisements can be organized (e.g., indexed or partitioned) by target zip code, target age group, target income level, or other such personal or demographic data so as to increase processing speed.

Additionally, for optimization purposes, data sets or "snapshots" of commonly performed queries can be periodically created that reduce the number of records that must be queried when selecting an advertisement. For example, the structured query language ("SQL") pseudo-code shown in Table 1 can be used to create a snapshot to be queried at a later time. Although only one snapshot is shown, the concept is equally applicable to virtually any subset of data from the database 744, including "super words". Thus, according to this technique, multiple snapshots can be used as the basis for queries when selecting an advertisement.

TABLE 1

CREATE SNAPSHOT daily_ads_west_coast_yuppie
    AS SELECT zip, state, city, income, age, sex, keywords, ad ID
        FROM ad table
           WHERE income >= 45000 AND
           age <= 45 AND (
           state=CA OR
           state=WA OR
           state=OR )
        GROUP BY zip, keywords;

Further details regarding various ways in which advertisements may be selected using a snapshot profile according to various embodiments disclosed herein will now be described. When selecting an advertisement, demographic information pertaining to the intended recipient 720 is queried to select the demographic profile snapshot best matching the intended recipient 720. If, for example, the intended recipient 720 matches a "west coast yuppie" profile, then the daily_ads_west_coast_yuppie snapshot can be queried for advertisements directed towards the intended recipient's more specific demographic profile.

For example, perhaps only female west coast yuppies are the target audience, the target age range is 22 through 30, and the target income is greater than $50,000. The daily_ads_west_coast_yuppie snapshot is then queried for advertisements matching the target criteria. For example, using the queried data set from the snapshot, one or more key word queries may be structured and then applied to the message body 712. Conversely, the message body 712 can be used to form the key word query (as shown in FIG. 7) that can be applied to the queried snapshot. Where the message body 712 is used to form the query, certain words or word types can be ignored—such as: "for", "the", "a", "an", "or", "on", "with", "so", etc.

FIG. 7 shows a general flow diagram of an embodiment of the process described above. It is noted that if demographic information of the intended recipient 720 is not known, then the demographic information of the client who is the registered contact for the corresponding domain name (e.g., "smith.com") can be used.

Assuming that there is only one hit (i.e., one selected advertisement) based on the contents of the message body 712, then the corresponding advertisement identifier ("ad ID") from the ad keyword table 966 can be used to select an advertisement to insert into the e-mail message 704. It may also occur, however, that multiple advertisements match the demographic and/or key word criteria pertaining to the intended recipient of the e-mail message 704. If there is more than one advertisement hit based on the contents of the message body 712, there are a variety of ways to select one of the advertisements (or more than one) for association with the e-mail message 704. For example, one of the advertisements can be selected at random and associated with the e-mail message 704, or else the advertisements can be rotated in a round robin fashion, or, alternatively, the query hits can be ranked in a priority order (e.g., by value) and the highest priority (e.g., most valuable) advertisement selected.

Some advertisements can have more than one key word or phrase associated with them, making the likelihood of hits greater in response to a query of the message body 712. Also, some advertisers might give greater weight a particular demographic field, key word/phrase, or data set than other advertisers, such as by paying a premium for matching demographic insertions. If the advertiser pays more for the advertisement placement, then that advertiser's advertisements can, in the event of multiple matching advertisements, be given priority over other advertisers who are not willing to pay as much for each selected advertisement. In another embodiment, where a tie results, advertisements associated with key words in a particular location in the message body 712 (for example, closest to the start of the message body 712, or in a subject header) are ranked higher than advertisements associated with key words found elsewhere in the message body 712 (e.g., later occurring words).

Alternatively, as illustrated in FIG. 7, where more than one key word hit results (e.g., content text 724 and 728), then more than one advertisement (e.g., advertisements 736 and 740) can be associated with the e-mail message 704 or intended recipient.

In a preferred embodiment as disclosed herein, the selected advertisement is inserted into the message body 712 to form a modified e-mail message body 748. Where multiple advertisements are selected, multiple advertisements (such as advertisements 736 and 740 shown in FIG. 7) may be inserted into the body 712 of the e-mail message 704, resulting in modified message body 748. Similarly, the forwarding e-mail address 732 can be inserted back into the message header 708 to form message header 744, or else the original message header 708 can simply be retained.

In an alternative embodiment, the advertisement is not inserted into the message body 712, but instead is sent as an attachment to the e-mail message 704. When the e-mail message 704 with the attached advertisement is received, software at the recipient's computer station detaches the advertisement and displays it in a selected portion of the user's computer screen, or else the recipient's e-mail server can detach the advertisement and instruct the recipient's computer station as to where to place the advertisement.

In another embodiment, the advertisement is sent apart from the original e-mail message 704. In such an embodiment, the advertisement can be queued or flagged for delivery at a later time. For example, if a hit on a key word "football" was found, and the advertisement is for a football sporting event, then the advertisement may be sent closer to a time when the sporting event will occur. Such a technique may be referred to as "asynchronous" advertisement presentation, since the advertisement is not delivered concurrently with the original e-mail message 704. When sent at the later time, the advertisement may be associated with a different e-mail message sent to the same intended recipient, or else it could be sent as its own, self-contained e-mail or advertisement message. As a variation of the above, when a key word match occurs but no current advertisement is available for that key word, a later advertisement may be sent to the intended recipient after a new advertisement matching that key word is added to the database 744 after the fact. To facilitate asynchronous advertisement presentation, the e-mail processor may maintain a queue of "delayed" advertisements, ranked in chronological order of when the advertisement is due to be sent.

In various embodiments, location placement information can also be included with the advertisement. Location placement information controls where on a computer screen the message will be displayed when the message is opened. If location placement information is included with the e-mail message, then the client's computer station is preferably configured with software capable of placing the advertisement according to the location placement information included with the advertisement.

Once the e-mail message to be forwarded has been constructed, the mail transfer agent 716 forwards (or relays) the e-mail message 704 on to the intended recipient at the forwarding e-mail address 732.

The advertisement inserted or attached to the e-mail message 704 can be in any of a variety of formats. The database 744 may maintain information as to what types of files the intended recipient's computer station (or mail system) supports (e.g., MIME, UUE, text, binary, etc.). If, for example, the information in the database 744 indicates that the computer station at the forwarding e-mail address supports binaries or other graphics files, then an advertisement corresponding to such a type may be preferred. If no known format types are found in the database 744, then the advertisement is preferably inserted or attached as an ASCII text message, since such a format is the most likely to be supported by the recipient's software. Uniform resource locators (URLs), or hypertext markup language (HTML) banners can also be inserted into the body 712 of the message, which can link the recipient's computer to an external site when the message is read "on line".

According to one embodiment, advertisement selection and/or presentation information is stored in the database 744. For example, whenever a particular advertisement is inserted into or attached to the e-mail message 704, a counter corresponding to the advertisement is incremented. Preferably, a record is generated that conveys information identifying the demographic information corresponding to the advertisement insertion. For example, the birth date and zip code corresponding to the e-mail forwarding address 732 can be stored in an advertisement placement or "counter" table in the database 744 (e.g., ad counter table 968 in FIG. 9). A new record can be generated for every advertisement placed, thus a body of demographic information can be maintained and fed back to the particular advertiser and used as a basis for billing.

According to one embodiment, the particular advertiser pays an overhead charge plus an insertion fee based upon the contents of the advertisement counter table in the database 744. The value/cost of the insertion can vary. For example, if the advertiser is targeting a particular age group of consumers, then advertisement insertions into e-mail message 704 that match that age group may have the highest value. Similarly, the advertiser may want to target consumers in a particular geographic location, such as a local movie theatre or car dealer might. Accordingly, a value/cost of the advertisement increases as the advertisement counter demographics more closely match the intended audience demographics. At the close of a particular billing cycle, the advertisement counter table can be analyzed. A report can be generated detailing the demographics of the insertions and a cost computed that weights target demographic information more heavily than insertions missing the target.

The same principles discussed above can be applied to outbound electronic messages where a computer system hosts electronic message services or where the computer system routes electronic messages through an electronic advertisement selection system prior to delivering the electronic messages to a remote system (or the same system). In such an embodiment, rather than forwarding the electronic message to a recipient address, the content of the outbound electronic message is used as the basis for a keyword query. If demographic information is also used as the basis for selecting an advertisement, then the demographic information used in selecting the advertisement can be drawn from the sender of the electronic message, rather than the intended recipient's demographic information, which may not exist.

Hypertext Transfer Protocol Services

In another embodiment as set forth and described herein, a system including a name server (such as multi-threaded name server 300 shown in FIG. 3) not only acts as the authority for numerous host names, responds to resolution requests, and directs the requests toward the host address included in the request handler's response, but it also provides hypertext transfer protocol services.

Figure 8:
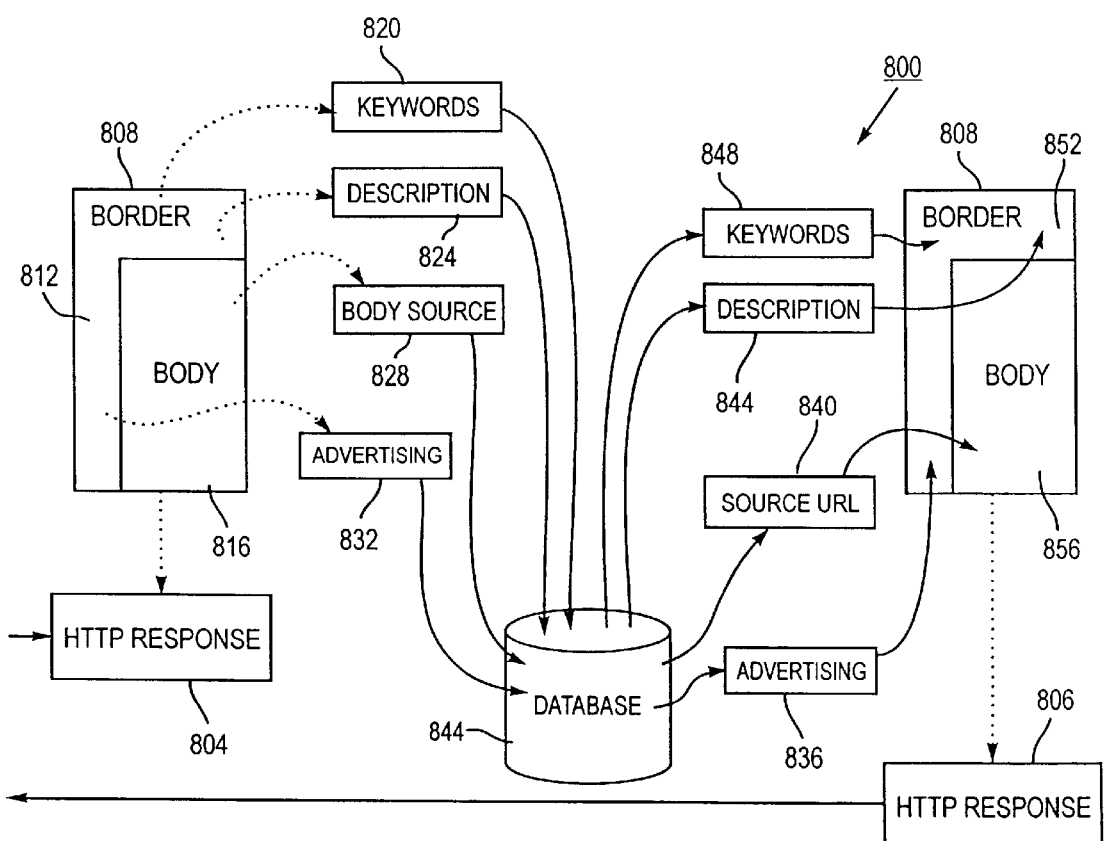
FIG. 8 is a diagram depicting a hypertext transfer protocol services system.

FIG. 8 depicts a flow diagram and presently preferred embodiment of the hypertext transfer protocol services system 800 according to one embodiment as described herein. The hypertext transfer protocol services system 800 is, as mentioned, preferably used in conjunction with a system acting as the authority for numerous host names. According to the system and process depicted in FIG. 8, a hypertext transfer protocol ("HTTP") request 804 is received at a webserver. The webserver, although not shown physically in FIG. 8, is embodied in the process by which an HTTP request and response is handled. The HTTP request 804 comprises, among other things, a host name. The host name associated with the HTTP request 804 is extracted by an HTTP software process (not shown) and a database 844 (which may be the same as database 344 shown in FIG. 3, assuming the functionality of the FIG. 3 and FIG. 8 systems and processes are at least partially combined) is searched for a corresponding template. The host name may, if desired, first be verified in a host name table (similar or the same as host name hash table 332 shown in FIG. 3) to ensure that it is has been properly routed to the correct host address (since, preferably, a single address services multiple domain names). However, alternatively, a web source table (e.g., web source table 914 in FIG. 9) can also (or instead) be queried to determine the validity of the host name or address.

Next, the HTTP software process retrieves a hypertext markup language ("HTML") template 808 that corresponds to the host name. Preferably, the HTML template 808 is retrieved from the database 844, or from the web source table, or else from a template table if multiple HTML templates are employed by the system 800.

According to one embodiment, a frame-based template 808 is employed by the system 800. HTML frame based templates are advantageous for at least two reasons. First, a frame border 812 such as illustrated in FIG. 8 can be controlled by the hypertext transfer protocol services system 800. Second, the body 816 of the frame template 808 can be embedded or redirected from another source on the Internet.

When the frame template 808 is retrieved, there will be various fields for which values must be inserted before the HTTP response 806 can be returned to the requester. The hypertext transfer protocol services system 800 queries the database 844 for data to insert into the various fields. For example, fields can include a keywords field 820 and a descriptors field 824 (e.g., for meta tags), as well as a body source field 828. These fields are filled with data from the queries, shown as keywords 848, description 844, and source URL 840 (e.g., "http://users.aol.com/asmith832/business/index.html").

Additionally, an advertisement 836 can be retrieved from the database 844. According to a presently preferred embodiment, an advertisement query 832 is generated that corresponds to the demographic and/or usage information of the domain name. For example, if the website usage is commercial and is for a real estate agent, then an advertisement for a competing real estate agent would be avoided. To avoid such problems, the client who controls the domain name can be given the option of selecting advertisements that are acceptable for their website, or providing their own advertisement. An advertisement 836 is retrieved from the database 844 and inserted in to the border 812 to form border 852. Similar to the technique described above with reference to Table 1, snapshots can be employed to pre-generated frequently generated queries.

The frame body 856 is preferably redirected from another source, so that when data is inserted into the fields of the original template 808, the result, now containing no blank fields in border 852 or body 856, can be returned as an HTTP response 806 to the requester.

As was the case in the e-mail advertisement system 700, historical advertising presentation information can be stored back into the database 844. Here, however, the advertisement presentation information corresponds to hits to the website, rather than to e-mail forwarding. The same table for historical advertising presentation information may be used if the database integrates both HTTP and SMTP services; however, in such a case, an informational field is preferably added so that advertising inserted into e-mail messages can be distinguished from advertising inserted into HTML templates. Advertising cost information can be similarly supported in hypertext transfer protocol services system 800, as in e-mail forwarding system 700 shown in FIG. 7.

According to one embodiment, a web cache (in random access memory) is employed for increasing response times for HTTP requests. The web cache, although not shown in FIG. 8, maintains recently or frequently requested HTML pages. When a page is first requested, data from the database is accessed and a page is built, as is described above, and is stored in the web cache (in addition to being returned to the requester).

Figure 9:
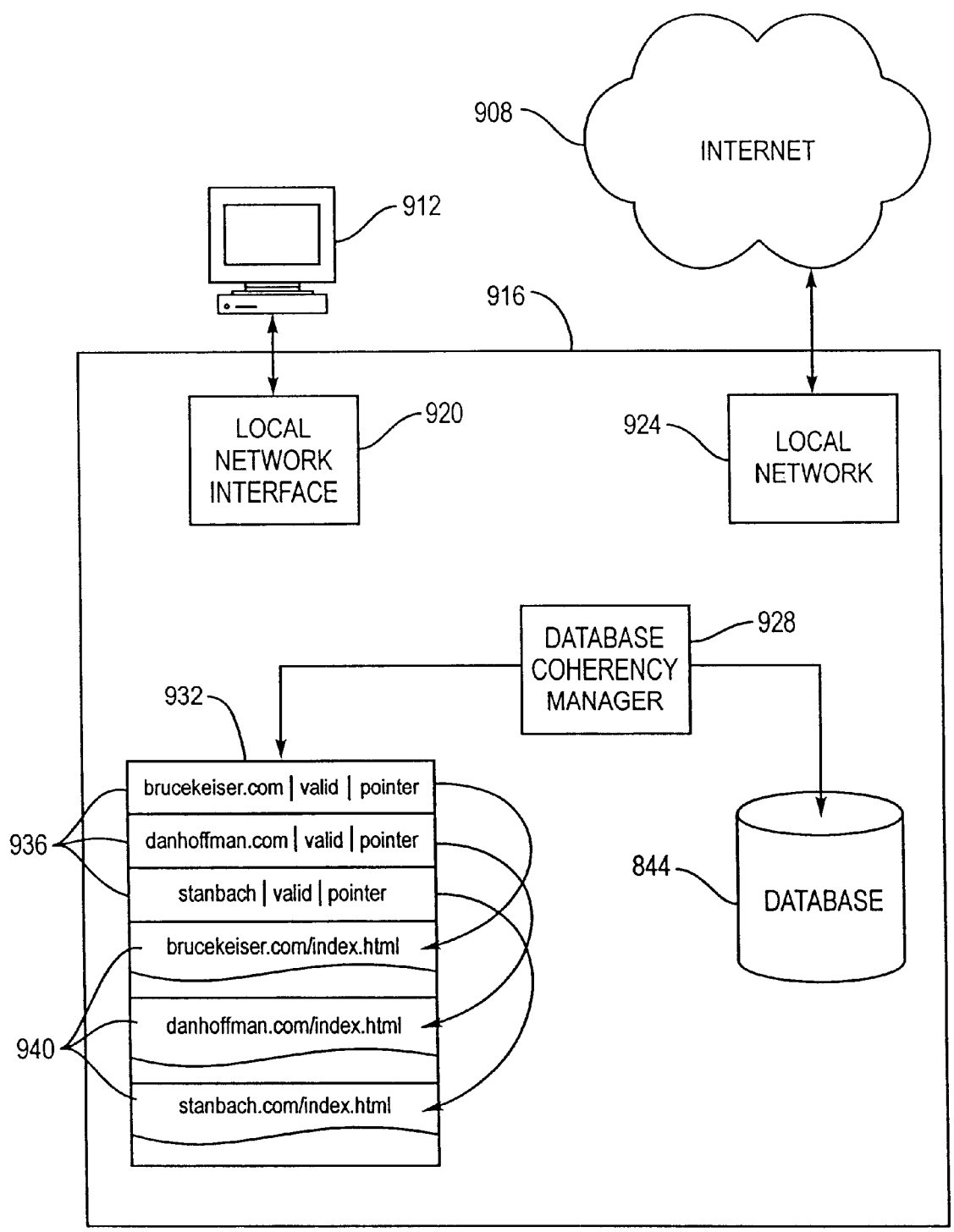
FIG. 9 is a block diagram of a web server including a web cache system.

FIG. 9 depicts an embodiment of the web server 916, including a web cache 932 formed from a random access memory. A system controller is connected to the web server 916 via a local network interface 920, and the web server 916 is connected to the Internet 908 via a network interface 924.

The web server 916 comprises a database coherency manager 928, similar to database coherency manager 283 depicted in FIG. 2. However, here the database coherency manager 928 maintains frequently accessed and/or recently requested HTML pages (e.g., HTML pages 940).

The web cache 932 comprises frequently accessed and/or requested host name records 936, each of which further comprise a domain name, a valid/invalid flag, and a pointer to a corresponding HTML page (e.g., HTML pages 940) preferably contained in the web cache 932.

The web cache 932 can be virtually any size. However, as the number of host name records 936, and corresponding HTML pages 940, increases, the organization of the web cache 932 preferably allows for fast location of data, such as by aid of a standard B-tree index (generally known in the art) or a hashing mechanism (also generally known in the art). The indexing or hashing mechanism can be performed by the database coherency manager 928, or by a web cache manager (not shown) located between or coupled to both the web cache 932 and the database coherency manager 928.

In one embodiment, the hashing mechanism divides the web cache 932 into two sets of hash buckets (as used herein, a hash bucket is memory block). A first set of hash buckets corresponds to the host name records 936. The second set of hash buckets corresponds to the HTML pages 940. The purpose of the hashing mechanism is to distribute potential "hot spots" of the web cache equally about the web cache 932, while at the same time providing a particular organization to the web cache 932 so that accessing data in the web cache is faster. The particular algorithm or formula used to divide the web cache 932 into hash buckets can vary between implementations.

According to one embodiment, the first time an HTML page is constructed, it is returned as a response via the network interface 924 to the requester. However, it is also stored in the web cache 932. The domain name is stored in the host name records 936, together with a valid flag and a pointer to the location of the copy of the recently constructed HTML page 940.

When the database coherency manager 928 detects changes that affect construction of the domain name's corresponding HTML page, the database coherency manager 928 causes the web cache entry for the particular host name record 936 to be invalidated by setting the valid/invalid flag to "invalid". For example, the database coherency manager 928 can perform this operation itself, or it can direct the web cache manager (not shown) to perform this operation. The host name record and corresponding HTML page will remain "invalid" until it is next requested, when it will be retrieved from the database 944 and resaved in the web cache 932. The valid/invalid flag will then be reset to "valid".

Centralized Database

A preferred centralized database is now described in more detail according to one embodiment of the inventions. In a preferred embodiment, the centralized database is the same database as is described below as databases 344, 744 and 844 described in connection with FIGS. 3, 7 and 8, respectively. However, the centralized database can be standalone in the sense that it is not associated with the e-mail forwarding system 700 (FIG. 7) or the hypertext transfer protocol services system 800 (FIG. 8), and the fact that the database can serve additional functions should not be construed as limiting on the embodiment of FIG. 3 by any means. For convenience, the centralized database is referred to as database 344.

It should further be noted that the centralized database 344 described below illustrates certain principles and exemplary techniques according to the preferred embodiments as disclosed herein. Various modifications can be made to the database 344, such as the addition or deletion of fields and tables, or the restructuring of tables and/or joins to the various tables without departing from the principles of the preferred embodiments or the broader spirit of the invention. Likewise, whenever the term "database" is used herein, it should also be recognized that tables or other file structures can be employed and cross referenced without implementation of a database per se. Additionally, no data types are given for the data structures, as they are simply a design choice for a skilled database developer.

Moreover, the centralized database described in detail below can be implemented with any number of commercially available relational database management systems. For example, the centralized database can be implemented in Microsoft Corporation's SQL Server 7.0 or Oracle Corporation's Oracle 8i relational database management systems.

Figure 10:
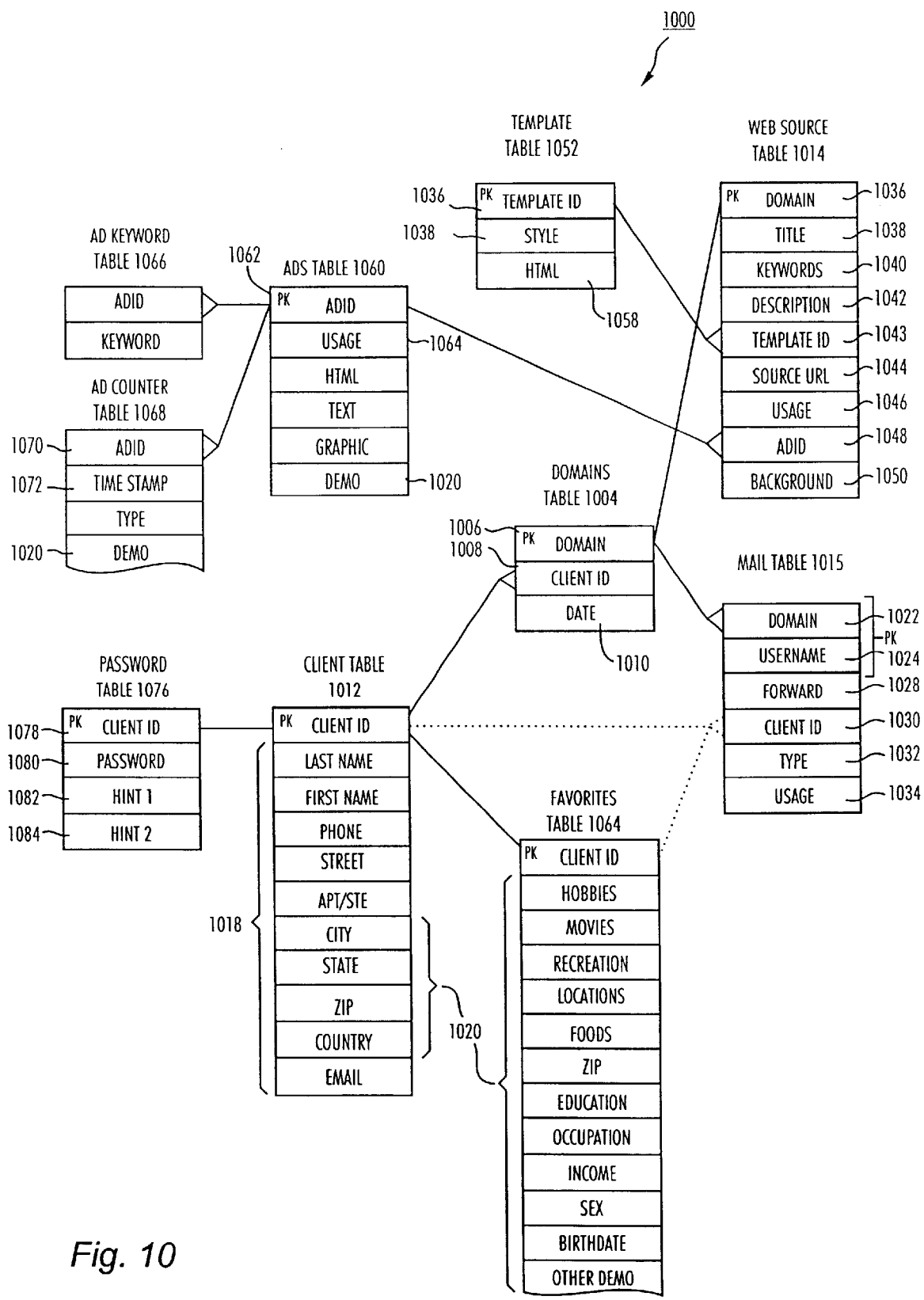
FIG. 10 depicts a database schema according to a preferred embodiment as described herein.

FIG. 10 depicts an embodiment of the schema 1000 for a preferred centralized database 344. While a number of tables are shown in the database schema of FIG. 10, not all of the tables shown are required for the implementation of the various embodiments discussed herein. The number of tables required and their particular nature and contents will depend in part both on the nature and extent of Internet hosting services provided.

The database 344 shown in FIG. 10 comprises, among other things, a domain names table 1004. The domain names table 1004 preferably includes the minimum number of fields required to preserve its functionality, thus reducing the footprint (i.e., the memory size) of data that is continuously scanned by the database coherency thread 340 (see FIG. 3). Redundant or duplicative information can be stored, for example, in the address table 336 (also shown in FIG. 3). Information included in the domain names table 1004 may include such items as a host name field 1006, a client ID field 1008 and a date field 1010.

The domain field 1006 preferably acts as the primary key for the domain names table 1004. As the primary key, exact duplicates are not allowed and indexing is performed on the domain field 1006 (it is noted that this general rule is followed whenever a field is referred to as a "primary key" for a particular table). The client ID field 1008 is used to join the domain names table 1004 with a client table 1012, which is described in more detail below. The date field 1010 is used to designate the last date on which the domain name record was updated. The date field 1010 can comprise, for example, a simple time stamp. If the time stamp is recent, then the database coherency thread 340 will not have to bother with checking for updates to the particular record in the domains table 1004. For example, if any updates have occurred since the last query of the domain table by the database coherency manager then those updates are propagated. Preferably only modified records from the domain names table 1004 are propagated to the host name cache.

The client table 1012 of the database 344 stores important contact and demographic information concerning various Internet subscribers—such information is used extensively where e-mail advertisement insertion is performed based on demographic data, or where advertisements are added to an HTML response. However, some of this information can alternatively be stored in a web source table 1014, or a mail table 1016, or a favorites table 1064—each are described in detail below. The client table 1012 is joined to the domain names table 1004 through the client ID field common to both tables. In the client table 1012, the client ID field preferably acts as the primary key. There should thus be at least one record in the client table 1012 for every record in the domain names table 1004.

Typical contact information 1018 is preferably included in the client table 1012. Some of the contact information also doubles as demographic information 1020, such as the city, state, zip code and country. Additional information, such as household size and lifestyle preference fields can be added to the demographic information 1020 stored in the client table 1012; however, according to one embodiment, the other demographic information is stored in the favorites table 1064, described below in more detail.

If e-mail forwarding services and e-mail advertisement presentation services, such as those described above with reference to FIG. 7, are provided in the system, then a mail table 1016 is preferably employed. The mail table 1016, if present, is joined to the domain names table 1004 through the domains field common to the two tables. There can be many records in the mail table 1016 for every corresponding record in the domain names table 1004. The primary key in the mail table 1016 is preferably the combination of the domain field 1022 and the username field 1024.

The e-mail forwarding address field 1028 identifies the true e-mail address of the intended recipient of an e-mail message. In a preferred embodiment, the domain field 1022 and the username field 1024 are used by the e-mail forwarding system 700 when matching information identifying the intended recipient 720 (e.g., the "RCPT To" matches the domain field 1022 and username field 1024) to the forwarding e-mail address 732 (e.g., the e-mail forwarding address field 1028).

Additional fields in the mail table 1016 include the type filed 1032, that identifies the type of e-mail message supported by the intended recipient (e.g., SMTP, Internet, and file types such as mime, binary, HTML, etc.), and the usage field 1034, that designates whether the mail is for personal use, commercial use, or both. Depending on the usage, different types of advertising can be directed to the user.

A client ID field 1030 is also included in the mail table 1016. As shown in FIG. 10, a dashed line joins the mail table 1016 to the client table 1012. The dashed lines signifies that direct joins between the tables can be made without passing through an intermediate table. There is also shown in FIG. 10 a one-to-many relationship vis-a-vis the client table 1012 and the mail table 1016, as a single client may maintain several domain names. It is not necessary that the client ID field 1030 have a value, although it is preferred. This is because there may be many more than one username to which mail can be forwarded for a particular domain and demographic information may not be available on all users. In such a circumstance, the demographic information may be pulled back through the client ID in the clients table 1012 corresponding to the client ID 1008 in the domain names table 1004.

If web server services, such as those described above with reference to FIG. 8, are provided by the system, then a web source table 1014 is preferably employed. The web source table 1014, if present, is used to identify the HTML template 808 corresponding to the host name in an HTTP request 804, as well as to provide the data to be inserted into template fields. The primary key for the web source table 1014 is preferably the domain field 1036. The web source table 1014 is joined to the domain names table 1004 by the domain fields in each of the two tables. There should be at least one record in the web source table 1014 for every record in the domain names table 1004.

Web source table 1014 includes a title field 1038, for insertion into a title meta tag in the HTML template 808. Additionally, the web source table 1014 includes a keyword field 1040 and description field 1042, also for insertion into corresponding meta tags in the HTML template 808. A source URL field 1044 holds data for redirecting/embedding the body of the frame into the template 808 from another source, as was described above with reference to FIG. 8.

A usage field 1046 specifies the type of website the information contains, such as commercial, personal, or other, as well as the types of information contained therein— such as legal work, real estate brokerage, medical discipline, accounting services, etc. The ad ID field 1048 can specify types of advertisements that can be linked to the site, or it can specify a particular set of advertisements (or a single advertisement) that may be unobjectionable in the frame around the website. Preferably it designates a particular advertisement that is acceptable for the website. According to one embodiment, a query is made daily to determine which advertisements can/should be linked the web source ad ID 1048 (e.g., advertisement 836 in FIG. 8). The background field 1050 specifies preferences for the background of the HTML template, such as the color, font type, font size, etc.

Whereas the fields inserted into the templates are generally consistent for all templates, according to one embodiment the particular type of template may vary, such as the border size, scrolling options, or even different positioning of borders (e.g., side bar only, top bar only, bottom bar only, top and side bars). Such an embodiment further adds a template ID field 1043 to the web source table 1014, as well as a template table 1052.

A template table 1052, if employed, preferably includes a template ID field 1054 and an HTML field 758. A template style field 1056 may also be used to quickly identify various HTML template patterns. The template ID field 1054 is preferably the table's primary key. The template table 1052 is joined to the web source table 1014 by the template ID fields in each table. There can be a one-to-many relationship between the template ID fields in the template table 1052 and web source table 1014, respectively.

The ads table 1060 stores advertisements that can be inserted into or associated with e-mail messages 704 to be forwarded, as described in connection with the e-mail forwarding system 700 of FIG. 7, or into the HTML templates 808, as in the case of system 800, or both. The ads table 1060 is joined to the web source table 1014 by the ad ID fields in each table. The ad ID field 1062 preferably acts as the primary key for the ads table 1060.

The ads table 1060 is preferably configured to store the advertisements that will be inserted into the appropriate medium, as well as certain demographic information to which the advertisements are targeted. For example, the same demographic information 1020 stored elsewhere in the database 1044, such as in the client table 1012 or in the favorites table 1064 (describe below) is stored in the ads table 1060. As for the advertisement file types, the ads table can include an HTML, a text, a graphic or a binary file (e.g., GIF, JPG, WAV, MOV, AVI, etc.).

The ads table 1060 can also include a usage field 1064, which specifies the type of domain or e-mail system to which the advertisement is best placed, such as commercial or personal and sub-classifications within each type. Additionally, demographic data in the ads table 1060 can specify rankings or weight to be given to each piece of demographic data, or a demographic data set. For example, some advertisers might rank an advertisement placement for a person having an income above one amount (e.g., $60,000) higher than for someone having an income of a lesser amount (e.g., $20,000).

Because there may be many keywords associated with a particular advertisement, and because there are likely to be many queries involving the ads table 1060, the keywords can be maintained outside of the ads table 1060, for example in an ad keyword table 1066. The number of ads can thus quickly be screened first by demographic information, and then by the context or content of the e-mail message when being inserted into or associated with an e-mail message 704. If advertisements are placed using a similar technique in HTML templates, as described in connection with the hypertext transfer protocol services system 800 shown in FIG. 8, a similar reduction mechanism can be employed. No primary key is necessary (although one may be used) for the ad keyword table 1066, which is joined to the ads table 1060 through the ad ID fields in each table. There is a one-to-many relationship between records in the ads table 1060 and in the ad keyword table 1066.

Although not explicitly shown in ad keyword table 1066, additional fields such as a ranking or weight field can be included to give a particular key word or phrase more weight than others. Furthermore, the same field can also indicate whether a particular advertiser or advertisement "owns" the key word, meaning that the advertiser has exclusive rights with respect to that key word. Thus, whenever the key word appears in an e-mail message to be forwarded, the advertisement(s) associated with that word should appear (subject to the ad selection processes described herein should multiple key word hits occur). Alternatively, a weight field and a zip code field within the ad keyword table 1066 can be used. In such an embodiment, the zip code field specifies one or more zip codes (i.e., territories) in which a particular advertiser has exclusive rights to (i.e., "owns") the particular key word.

It is preferred that advertisement presentation information, as described above with reference to FIGS. 7 and 8, is maintained by the centralized database 344. The centralized database 344 preferably records advertisement presentation information in an ad counter table 1068. The ad counter table 1068 can be joined to the ads table 1060 by way of the ad ID field in each table. Because there are likely to be many insertions (or "hits") for each advertisement, there is a one-to-many relationship between records of the ads table 1060 and records of the ad counter table 1068.

The ad counter table 1068 comprises an ad ID field 1070 and a time stamp field 1072 (for recording the date and time of the insertion/hit). A number of demographic information fields 1020 can identify the demographic data corresponding to the domain name or client ID. Alternatively, the client ID and domain corresponding to the insertion or website can be stored in a demographics fields, or a designated field can be added for each demographic field (e.g., demographics fields 1020).

If asynchronous advertisement insertion is employed, then the ad counter table 1068 may include a field identifying the forwarding address. A time-triggered procedure call (e.g., a PL/SQL function) can query the ad counter table 1068 and spool out any advertisements to the forwarding address asynchronously to the e-mail message forwarding. If privacy of the e-mail recipient is a concern, then the client ID and domain name can be deleted from the ad counter table 1068 after spooling, or else synchronous advertisement insertion should be employed instead of asynchronous advertisement insertion. According to one embodiment, the e-mail forwarding system 700 described in connection with FIG. 7 checks a user's demographic data to decide whether synchronous or asynchronous advertisement insertion should be performed.

Two additional tables are also shown for the database 344. They are the favorites table 1064, which is used to pinpoint interests corresponding to the client ID in the client table 1012, and a password table 1076. The favorites table 1064 is essentially a table for storing demographic information 1020. The favorites table 1064 can be used to store demographic information 1020 corresponding to the client ID stored in the mail table 1016. The favorites table 1064 can be joined to both the client table 1012 and the mail table 1016, as is shown by the dashed join in FIG. 10. Exemplary demographic data fields are shown in table 1064.

The password table 1076 comprises administration information that can be used to modify information associated with a client. Thus, the client ID field 1078 is the primary key, which joins, via a one-to-one correspondence, with the client table 1012.

A password field 1080 comprises a password. According to one embodiment, the password is encrypted to prevent unauthorized access to the information. Because there are likely to be a large number of users modifying their domain information, it is desired to minimize the requirement of administrator intervention. Accordingly, two hint fields 1082 and 1084, which can also be encrypted, provide hints likely to lead to successful entry of the correct password for the particular client ID 1078 in the event that a user forgets or misplaces her password.

According to a preferred embodiment, an HTML-based configuration interface (or other suitable interface) is provided that allows users to personally configured or modify both their domain information as well as their demographic information. Preferably, the HTML-based configuration interface is access via a secure connection, such as HTTPS. The HTML configuration interface provides a secure link back to selected information stored in the database 344 and allows users to quickly perform such tasks as adding e-mail usernames, selecting advertisements, and maintain their demographic and contact information through HTML and Java type forms.

Integrated Internet Hosting System

Figure 11:
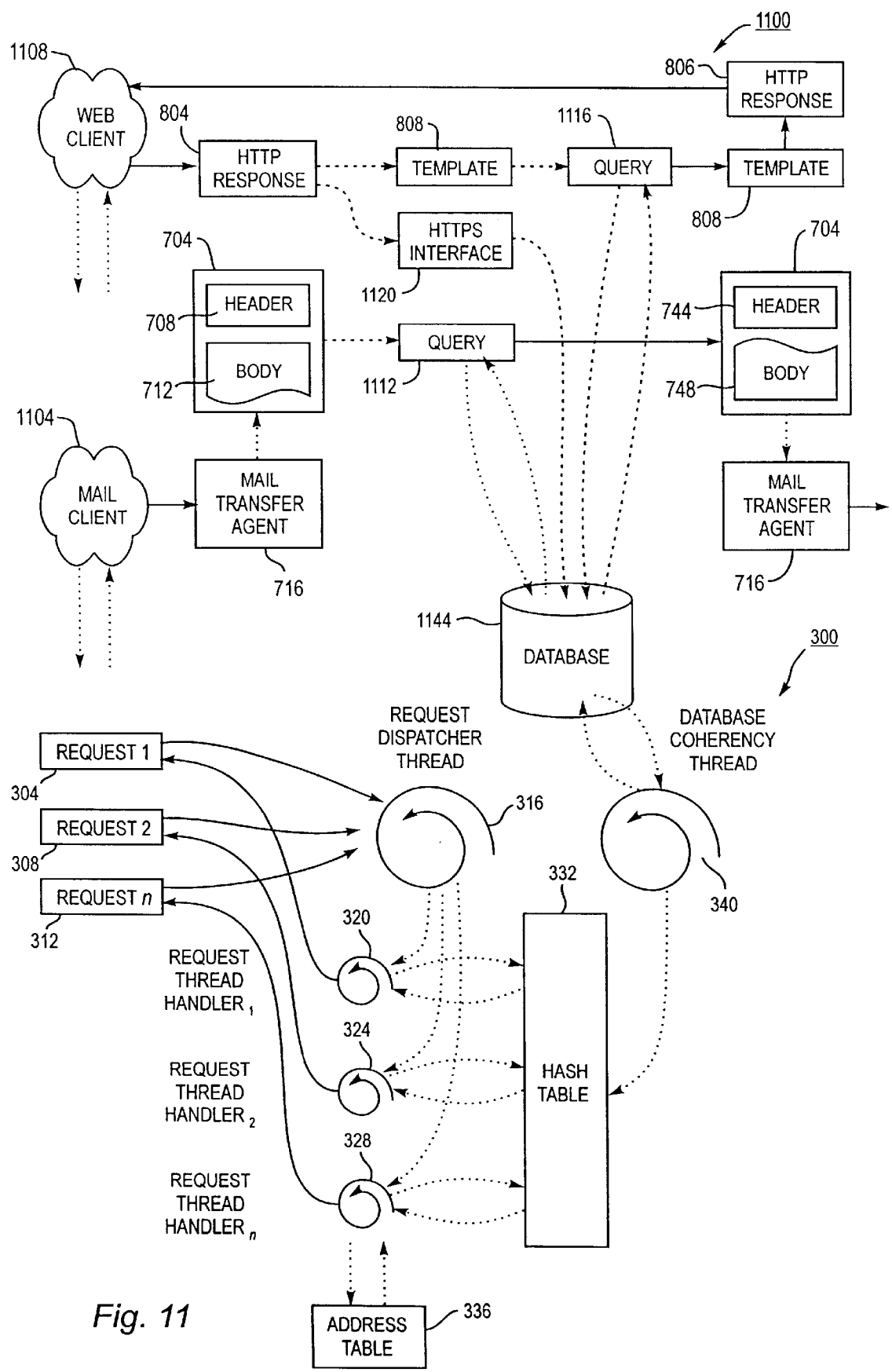
FIG. 11 is a diagram depicting an integrated internet domain hosting system.

FIG. 11 depicts a presently preferred integrated internet hosting system 1100. The components in FIG. 11 are shown integrated into the single internet hosting system all centered around the centralized database 1144, which is analogous to database 344 described above in connection with FIG. 10. The internet hosting system 1100 thus integrates functionality from the domain name server (such as domain name server 300) with one or more other servers, such as a web server (e.g., web server 800) and/or a mail server (e.g., mail system 700). The servers can run on a single computer system, or they can run on multiple, coupled computer systems.

Mail client 1104 and web client 1108 communicate resolution requests to the multi-threaded, non-blocking name server 300, which has been described in reference to FIG. 3. In turn, the name server 300 answers resolution requests for which it is the authority, while a database coherency thread 340 monitors the database 1144 for updated domain information. An appropriate response is returned the respective clients.

With a host address from the name server 300, a particular client is able to obtain Internet services. For example, the mail client 1104 can send an e-mail message 704 addressed to a user stored in the database 1144. When the e-mail message 704 is transferred by the mail transfer agent 716, an advertisement can be inserted therein or associated therewith. The advertisement can be selected based upon a query 1112, such a query 1112 including words from the context of the e-mail message body 712. The e-mail message 704, now having an advertisement inserted in it (or otherwise associated with it) can then be forwarded by the mail transfer agent 716 to a forwarding address identified in the database 1144.

Similarly, the web client 1108, with the host address from the name server 300, can retrieve an HTML page from the host name identified in an HTTP request 804. The HTML page is preferably dynamically generated based on a stored template 808, and information selected by a query 1116 of the database 1144. Data returned by the query 1116 is inserted into the template 808, which is returned as the HTTP response 806 to the web client 1108.

Further still, an HTTP, or HTTPS (hypertext transfer protocol secure) configuration interface 1120 is also part of the internet hosting system 1100. The interface 1120 allows users to personally configure their domain services offered by the internet hosting system 1100. For example, users can specify setup options such as domain names 1008, usernames 1024, demographic data 1020, web template styles 1038, or even advertiser information for the ads table 1060 (e.g., loading ads and specifying target demographic profiles for those ads).

Hardware Overview

Figure 12:
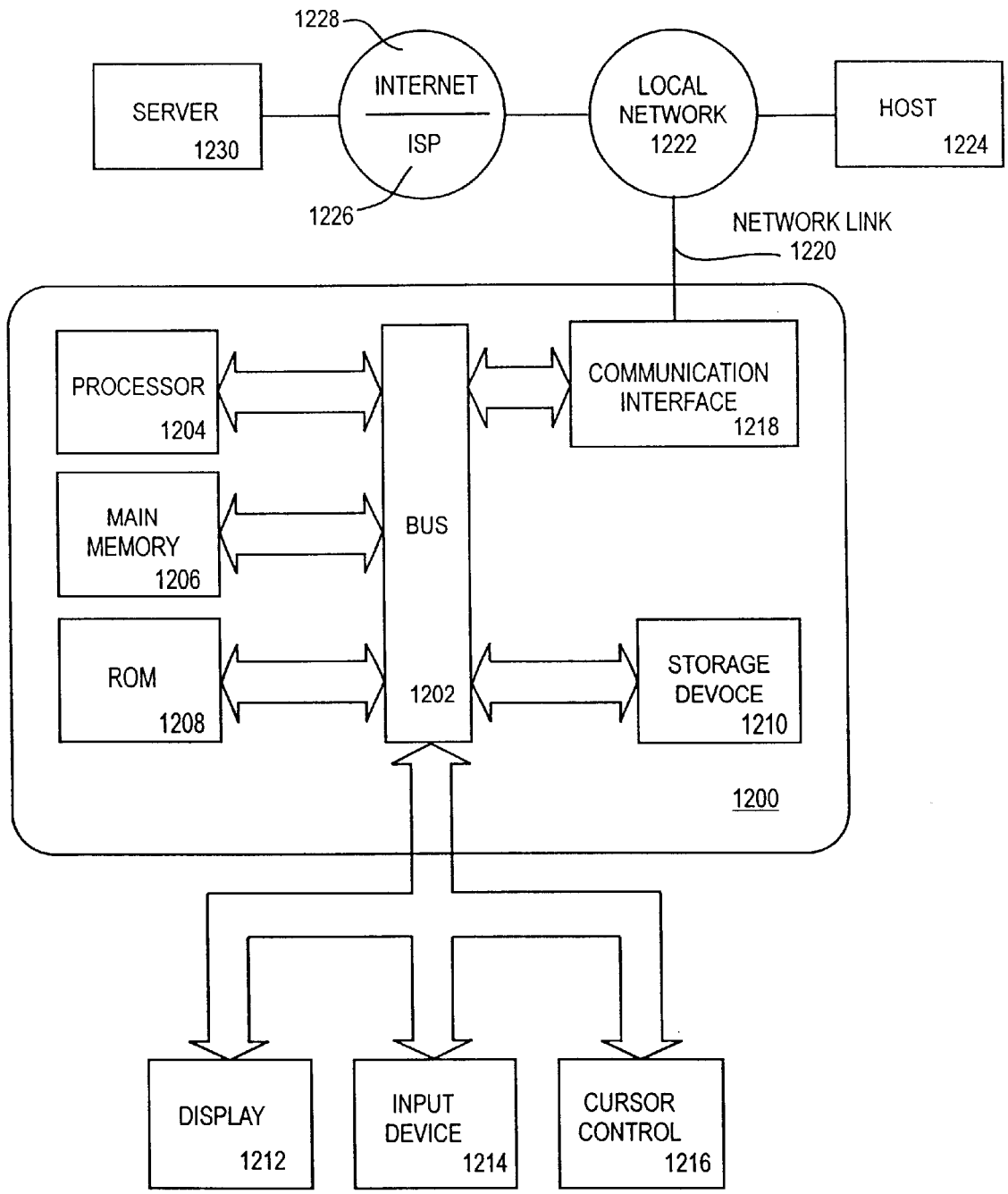
FIG. 12 is a block diagram of a computer system which may be utilized in connection with one or more preferred embodiments as described herein.

FIG. 12 is a block diagram illustrating a computer system 1200 upon which various embodiments as described herein can be implemented. An example of such a computer system is a Sun Microsystems Enterprise™ family system, or a Starfire™ system, running Solaris version 7. Programming can be implemented in the Sun Microsystems' Java programming environment. In another, equally viable embodiment, an Intel Pentium class computer system executing Microsoft Corporation's Windows NT operating system can be used. There, programming can be implemented via Microsoft's Java programming environment.

Since the hosting services can grow over time, the particular computer used can be gradually upgraded from a less powerful system, thus integrating scalability in the system. A general description of a computer system 1200 is provided below.

As shown in FIG. 12, the computer system 1200 includes a bus 1202 or other communication mechanism for communicating information, and a processor 1204 coupled with bus 1202 for processing information. The computer system 1200 also includes a main memory 1206, such as a random access memory ("RAM") or other dynamic storage device, coupled to bus 1202 for storing information and instructions to be executed by processor 1204. Main memory 1206 also may be used for storing temporary variables or other intermediate information during execution of instructions by processor 1204. The computer system 1200 further includes a read only memory ("ROM") 1208 or other static storage device coupled to bus 1202 for storing static information and instructions for processor 1204. A storage device 1210, such as a magnetic disk or optical disk, is provided and coupled to bus 1202 for storing information such as data structures and instructions, such as data stored in databases 291, 344, 744, 844 or 1144 (shown in FIGS. 2, 3, 7, 8 and 11, respectively).

The computer system 1200 may be coupled via bus 1202 to a display 1212, such as a cathode ray tube ("CRT"), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 can be employed for providing various Internet services and functionality as described herein, such a (multi-threaded) name server, e-mail forwarding, and other Internet hosting services as described above. According to one embodiment, such Internet-related services are provided by computer system 1200 in response to processor 1204 executing one or more sequences of instructions contained in main memory 1206. Such instructions may be read into main memory 1206 from another computer-readable medium, such as storage device 1210. Execution of the sequences of instructions contained in main memory 1206 causes processor 1204 (or multiple processors if a multi-processor system is employed) to perform the process steps described herein. In alternative embodiments, hard-wired circuitry may be used in place of or in combination with software instructions to implement the invention. Thus, embodiments of the invention are not limited to any specific combination of hardware circuitry and software. However, according to embodiments of the name server 300, the computer system 1200 is running an operating system that allows multi-threaded programming.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, ROM, a FLASH, or any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

The computer system 1200 also includes a communication interface 1218 coupled to bus 1202. Communication interface 1218 provides a two-way data communication coupling to a network link 1220 that is connected to a local network 1222. For example, the communication interface 1218 may comprise an integrated services digital network ("ISDN") card or a modem to provide a data communication connection to a corresponding type of telephone line. As another example, communication interface 1218 may comprise a local area network ("LAN") card to provide a data communication connection to a compatible LAN. Wireless links may also be implemented. In any such implementation, communication interface 1218 sends and receives electrical, electromagnetic or optical signals that carry digital data streams representing various types of information.

Network link 1220 generally provides data communication through one or more networks to other data devices. For example, network link 1220 may provide a connection through local network 1222 to a host computer 1224 or to data equipment operated by an Internet Service Provider ("ISP") 1226. ISP 1226 in turn provides data communication services through the world wide packet data communication network referred to herein as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information. Alternatively, communications interface 1218 can be connected directly to the Internet 1228 without intermediate equipment.

The computer system 1200 can send messages and receive data, including program code, through the network (s), network link 1220 and communication interface 1218. Using the Internet as an example, a server 1230 might transmit a requested code for an application program through Internet 1228, ISP 1226, local network 1222 and communication interface 1218. Such a downloaded application may be used to implement the various Internet-related services described herein.

The received code may be executed by processor 1204 as it is received, and/or stored in storage device 1210, or other non-volatile storage for later execution. In this manner, computer system 1200 may obtain application code in the form of a carrier wave. The computer 1200 can be employed as single function input output device, or it can be configured to function as a server, such as a database server or an application server or both. According to one embodiment, it functions as domain name server, and in other embodiments, it provides additional or other Internet hosting services as described herein.

The methods, techniques and apparatuses described herein are particularly useful as an Internet domain name hosting system. In such an embodiment, the system 1100 (see FIG. 11) provides Internet hosting services for a large number of domain names—for example on the order of thousands, tens of thousands, and even more domain names, especially where those same domains share a very small number of IP addresses (e.g., as few as two IP addresses). A user who obtains a domain name may obtain Internet hosting services for the domain name through the system 1100. Thus, the system 1100 functions in part as a directional services mapping system—allowing users to obtain many domain names, and providing a transparent Internet portal to all the domain names for which it acts as an authority—all from a single system.

The described embodiments herein can be directed towards small and mid-sized domains where the infrastructure cost to setup a proprietary or self-deployed system are prohibitive. In other words, the system 1100 can be a stepping stone for entry into the Internet foray, or even provide a long-term solution for multitudes of small and mid-sized domains.

The e-mail advertisement presentation features described herein can provide a technique for offsetting the costs of the services provided by the system. Similarly, the advertisement presentation features of the HTTP hosting system offset the costs of the services as well.

As set forth in the foregoing description, and in the accompanying figures, an Internet domain name hosting system is provided having a variety of advantageous features. According to various embodiments as described herein, an Internet domain name hosting system is configured to provide a multi-threaded, non-blocking name server for responding to multiple, concurrent host name resolution requests. In further or alternative embodiments, the system is configured to provide e-mail forwarding services. In further or alternative embodiments, the system provides hypertext transfer protocol services, possibly in conjunction with the provision of e-mail forwarding services. In at least one embodiment, a centralized database is provided for integrating the various services supported by the system.

The present inventions have been set forth in the form of preferred embodiments. It is nevertheless understood that modifications and variations of the disclosed techniques may be apparent to those skilled in the art after review of the above description, the drawings and other aspects of the present disclosure, without departing from the scope and spirit of the present invention. Moreover, such modifications and variations are considered to be within the purview of the appended claims.

What is claimed is:

1. An internet service system, comprising:
   a computer system including,
   one or more processors;
   a memory communicatively coupled to said one or more processors; and
   a disk communicatively coupled to said one or more processors; and
   wherein said one or more processors includes a first server, said first server configured to execute a multi-threaded domain name system, said multi-threaded domain name system comprising:
      a request dispatcher thread, said request dispatcher thread configured to receive multiple concurrent host name requests over a wide area network; and
      multiple concurrent request handler threads, each of said multiple concurrent request handler threads spawned by said request dispatcher thread and corresponding to exactly one of said multiple concurrent host name requests, each of said request handler threads configured to respond to exactly one of said host name requests by returning a host address if the requested host name is present in the host name cache or else to terminate the request if the requested host name is not present in the host name cache; and
   wherein said memory comprises a host name cache, said host name cache comprising a plurality of host names, said host name cache configured to be read by said multiple concurrent request handler threads;

wherein said disk comprises records for a database, said records comprising a plurality of host names for which said server is an authority and user information corresponding to said host names, said plurality of host names providing a foundation for said host name cache; and wherein said one or more processors further includes a second server, said second server configured to respond to a request directed to said host address returned by said first server, and further configured to include data stored in said database in its response;

wherein said request directed to said host address is an electronic message; and wherein said second server is further configured to:
  extract information identifying an intended recipient of said electronic message;
  match said extracted information to a forwarding address;
  select an advertisement corresponding to one or more words contained in said electronic message;
  forward said electronic message including data from said database to said forwarding address; and
  transmit said advertisement, either embedded in or separate from said electronic message, to said forwarding address.

2. The system of claim 1, wherein said second server is further configured to store ad placement information in an ad placement table in said database, said ad placement information indicating that said advertisement is associated with said electronic message.

3. The system of claim 2, wherein said ad placement information stored in said table includes demographic information corresponding to said intended recipient.

4. The system of claim 2, wherein said system is further configured to generate a cost for said advertisement, said cost corresponding to said ad placement information stored in said table.

5. The system of claim 2, wherein said request directed to said host address is a hypertext transfer protocol request, and wherein second server is further configured to:
  extract information identifying a host name from said hypertext transfer protocol request;
  retrieve a hypertext markup language template corresponding to said information identifying said host name;
  fetch template values corresponding to said host name;
  insert said template values into said template; and
  return said hypertext markup language template including said template values as a response to said hypertext transfer protocol request.

6. The system of claim 5, wherein said second server is further configured to:
  retrieve an advertisement corresponding to said host name;
  insert said advertisement into a frame that surrounds a body of said template; and
  store advertisement placement information indicating that said advertisement has been inserted into a hypertext markup language template.

7. The system of claim 1, further configured to transmit said advertisement to said forwarding address synchronously with said forwarding of said electronic message to said forwarding address.

8. The system of claim 1, further configured to transmit said advertisement asynchronously relative to said forwarding of said electronic message to said forwarding address.

* * * * *